(12) United States Patent
Shin et al.

(10) Patent No.: US 11,330,592 B2
(45) Date of Patent: May 10, 2022

(54) APPARATUS AND METHOD FOR CONTROLLING CONGESTION IN WIRELESS COMMUNICATION SYSTEM

(71) Applicant: Samsung Electronics Co., Ltd., Suwon-si (KR)

(72) Inventors: Cheolkyu Shin, Suwon-si (KR); Hyunseok Ryu, Suwon-si (KR); Jonghyun Bang, Suwon-si (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 16/930,608

(22) Filed: Jul. 16, 2020

(65) Prior Publication Data

US 2021/0022139 A1   Jan. 21, 2021

(30) Foreign Application Priority Data

Jul. 16, 2019   (KR) .................. 10-2019-0086019
Sep. 2, 2019    (KR) .................. 10-2019-0108448
Feb. 12, 2020   (KR) .................. 10-2020-0017027

(51) Int. Cl.
*H04W 72/04* (2009.01)
*H04W 24/08* (2009.01)
(Continued)

(52) U.S. Cl.
CPC ....... *H04W 72/0453* (2013.01); *H04W 24/08* (2013.01); *H04W 72/0406* (2013.01);
(Continued)

(58) Field of Classification Search
CPC ......... H04B 7/15; H04L 41/145; H04L 43/00; H04L 43/06; H04L 47/12–127;
(Continued)

(56) References Cited

U.S. PATENT DOCUMENTS 11,172,506 B2 *  11/2021  Lee ..................... H04W 76/14
2018/0242190 A1   8/2018   Khoryaev et al.

OTHER PUBLICATIONS

Qualcomm Incorporated, Sidelink Resource Allocation Mechanism for NR V2X, R1-1907271, 3GPP TSG RAN WG1 Meeting #97, Reno, USA, May 4, 2019, sections 4.3-4.4.

(Continued)

*Primary Examiner* — Thomas R Cairns
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The disclosure is for controlling congestion of a channel in a wireless communication system According to an embodiment of the present disclosure, a method performed by a terminal in a wireless communication system comprises determining a plurality of granted transmission resources for a sidelink communication, performing a transmission or a retransmission using at least one transmission resource among the plurality of granted transmission resources, receiving an acknowledgement (ACK) for the transmission or the retransmission, in response to the ACK, releasing one or more transmission resources among the plurality of granted transmission resources, measuring a channel occupancy ratio (CR) from transmission resources other than the released one or more transmission resources from the plurality of granted transmission resources, and transmitting a physical sidelink shared channel (PSSCH) to satisfy a condition that the measured CR does not exceed a configured CR limit so that a congestion control is performed.

14 Claims, 18 Drawing Sheets

(51) Int. Cl.
  *H04W 88/04*    (2009.01)
  *H04W 84/04*    (2009.01)
  *H04W 92/18*    (2009.01)

(52) U.S. Cl.
  CPC .......... *H04W 84/042* (2013.01); *H04W 88/04* (2013.01); *H04W 92/18* (2013.01)

(58) Field of Classification Search
  CPC ... H04W 4/40–48; H04W 8/005; H04W 8/20; H04W 16/08; H04W 16/18; H04W 16/26; H04W 24/02; H04W 24/08; H04W 24/10; H04W 28/0215; H04W 28/0221; H04W 28/0284; H04W 28/0289; H04W 36/00; H04W 36/0072; H04W 36/0083; H04W 36/0088; H04W 36/22; H04W 40/24; H04W 52/365; H04W 72/0406–0433; H04W 72/0453; H04W 72/08; H04W 72/12; H04W 72/1278–1294; H04W 74/002; H04W 84/042–047; H04W 84/22; H04W 92/18
  See application file for complete search history.

(56) References Cited

OTHER PUBLICATIONS

Spreadtrum Communications, Considerations on sidelink congestion control, R1-1906365, 3GPP TSG RAN WG1 #97, Reno, USA, May 2, 2019, section 3.
Oppo, Discussion on congestion control metrics, R1-1906479, 3GPP TSG-RAN WG1 Meeting #97, Reno, USA, May 3, 2019, section 2.
Huawei et al., BWP operation for V2X sidelink, R1-1906597, 3GPP TSG RAN WG1 Meeting #97, Reno, USA, May 3, 2019, section 2.2.2.
Huawei et al., QoS management for congestion control in NR V2X, R1-1906016, 3GPP TSG RAN WG1 Meeting #97, Reno, USA, May 3, 2019, section 2.1.1.
International Search Report dated Oct. 26, 2020, issued in International Application No. PCT/KR2020/009386.

* cited by examiner

APPARATUS AND METHOD FOR CONTROLLING CONGESTION IN WIRELESS COMMUNICATION SYSTEM

CROSS-REFERENCE TO RELATED APPLICATION(S)

This application is based on and claims priority under 35 U.S.C. 119(a) of a Korean patent application number 10-2019-0086019, filed on Jul. 16, 2019, in the Korean Intellectual Property Office, of a Korean patent application number 10-2019-0108448, filed on Sep. 2, 2019, in the Korean Intellectual Property Office, and of a Korean patent application number 10-2020-0017027, filed on Feb. 12, 2020, in the Korean Intellectual Property Office, the disclosure of each of which is incorporated by reference herein its entirety.

BACKGROUND

1. Field

The disclosure relates to a wireless communication system. More particularly, the disclosure relates to an apparatus and a method for controlling congestion in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a "Beyond 4G Network" or a "Post long term evolution (LTE) System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human-centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Various technologies, such as vehicle-to-everything (V2X) may be supported according to the development of a wireless communication system. A method for smoothly providing such V2X communication is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for controlling congestion when vehicle-to-everything (V2X) communication is provided in a wireless communication system.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method comprises determining a plurality of granted transmission resources for a sidelink communication, performing a transmission or a retransmission using at least one transmission resource among the plurality of granted transmission resources, receiving an acknowledgement (ACK) for the transmission or the retransmission, in response to the ACK, releasing one or more transmission resources among the plurality of granted transmission resources, measuring a channel occupancy ratio (CR) from transmission resources other than the released one or more transmission resources from the plurality of granted transmission resources, and transmitting a physical sidelink shared channel (PSSCH) to satisfy a condition that the measured CR does not exceed a configured CR limit so that a congestion control is performed.

In accordance with another aspect of the disclosure, a terminal in a wireless communication system is provided. The terminal comprises a transceiver, and at least one processor configured to: determine a plurality of granted transmission resources for a sidelink communication, perform a transmission or a retransmission using at least one transmission resource among the plurality of granted transmission resources, receive an acknowledgement (ACK) for the transmission or the retransmission, in response to the ACK, release one or more transmission resources among the plurality of granted transmission resources, measure a channel occupancy ratio (CR) from transmission resources other than the released one or more transmission resources from the plurality of granted transmission resources, and transmit a physical sidelink shared channel (PSSCH) to satisfy a condition that the measured CR does not exceed a configured CR limit so that a congestion control is performed.

The apparatus and the method according to various embodiments enables stable V2X communication to be performed via congestion control in sidelink (SL) communication.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
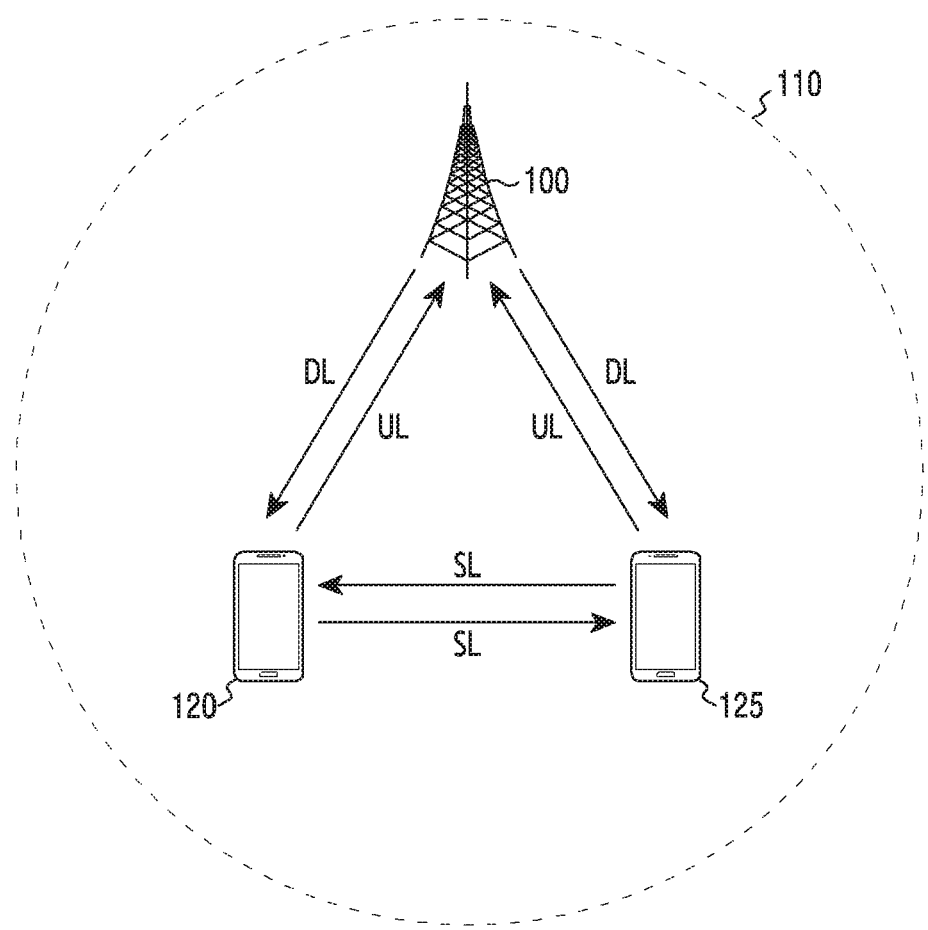
FIG. 1A illustrates a scenario for sidelink communication in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and a method for controlling congestion in a wireless communication system. Specifically, the disclosure is for controlling congestion of a channel in a sidelink communication between a terminal and a terminal, and relates to an apparatus and a method for performing congestion control according to a result of determining whether a channel is congested, based on a channel busy ratio (CBR) and a channel occupancy ratio (CR).

In the following description, terms used for a signal, terms referring to a channel, terms referring to control information, terms referring to network entities, terms referring to components of a device, and the like, are exemplified for convenience of description. Therefore, the disclosure is not limited to the terms described below, and other terms having equivalent technical meanings may be used.

In the following description, a physical channel and a signal may be used in combination with data or control signal. For example, a physical downlink shared channel (PDSCH) is a term referring to a physical channel via which data is transmitted, but PDSCH can also be used to refer to data. For example, in the disclosure, the expression "transmit a physical channel" may be interpreted to be equivalent to the expression "transmit data or a signal through a physical channel".

Hereinafter, in the disclosure, "upper signaling" refers to a signal transmission method in which a signal is transmitted from a base station to a terminal using a downlink data channel of a physical layer, or from a terminal to a base station using a physical layer uplink data channel. Upper signaling may be understood as radio resource control (RRC) signaling or media access control (MAC) control elements (CE).

In addition, in the disclosure, in order to determine whether a certain condition is satisfied or fulfilled, more or less expressions are used, but this is only a description for expressing an example and does not exclude descriptions of more or less. Conditions described as 'equal to or greater than' may be replaced by 'exceeded', conditions described as 'equal to or less than' may be replaced by 'below', and conditions described as 'below', conditions described as 'equal to or greater than or equal to or less than' may be replaced by 'below and below'.

In addition, the disclosure describes various embodiments using terms used in some communication standards (e.g., 3rd generation partnership project (3GPP)), but this is only an example for explanation. Various embodiments can be easily modified and applied in other communication systems.

In the disclosure, the transmitting terminal means a terminal that transmits sidelink data and control information or a terminal that receives sidelink feedback information. In addition, in the disclosure, the receiving terminal means a terminal that receives sidelink data and control information or a terminal that transmits sidelink feedback information.

Various attempts have been made to apply a 5G communication system to an IoT network. For example, technologies, such as sensor network, machine to machine (M2M) communication, and machine type communication (MTC) are implemented by techniques, such as beamforming, multiple-input multiple-output (MIMO), and array antenna, which are 5G communication technologies. It may be understood that the application of a cloud radio access network (RAN) as a big data processing technology is an example of the fusion of 5G technology and IoT technology. As described above, in a communication system, a method, in which a plurality of services can be provided to a user and each service can be provided within the same time period according to characteristics to provide the plurality of services to a user, and an apparatus using the same are required. Various services provided in 5G communication systems are being researched, and one of them is a service that satisfies the requirements of low latency and high reliability.

In the case of vehicle communication, the LTE-based vehicle-to-everything (V2X) system has been standardized in 3GPP Rel-14 and Rel-15, based on the device-to-device (D2D) communication structure, and currently, efforts are being made to develop a V2X system, based on 5G new radio (NR). In the NR system, unicast communication between a terminal and a terminal, groupcast (or multicast) communication, and broadcast communication will be supported. In addition, unlike LTE V2X, which aims to transmit and receive basic safety information necessary for road driving of a vehicle, the NR V2X aims to provide more advanced services, such as grouping, advances driving, extended sensor, and remote driving.

In the sidelink of V2X, whether the channel is congested or not may determine whether the channel is connected to the terminal and the configuration range of transmission parameters. This is a congestion control function that increases the probability of successful transmission by controlling the channel access by a terminal via dropping the transmission or scheduling adjustment when the channel is congested and by selecting a transmission parameter according to the congestion status of the channel when the channel is accessed. The terminal may measure a channel busy ratio (CBR) and select transmission parameters. The CBR is an index indicating how much the current channel is occupied by terminals, and a range of selectable transmission parameters may be determined according to the CBR value. Along with CBR measurement, the terminal may perform congestion control by measuring a channel occupancy ratio (CR). The CR is an index indicating how much the terminal has occupied the channel, and a CR limit for the terminal to occupy the channel may be determined according to the CBR value. For example, if the channel is congested (when the CBR value is measured high), the CR limit is configured as low, and the terminal should perform congestion control so that the measured CR does not exceed the CR limit. For example, the terminal should drop the transmission or satisfy the CR limit via scheduling implementation.

In the NR sidelink, since the hybrid automatic repeat and request (HARQ) positive acknowledgment (ACK)/negative acknowledgment (NACK) feedback and channel state information (CSI) feedback are considered, compared to the LTE sidelink, the operation of the transmitting terminal for congestion control as well as the operation of the receiving terminal may be considered for feedback on transmission. Therefore, an operation in which the transmitting terminal and the receiving terminal exchange CBR information may be considered. In addition, in the NR sidelink, as a retransmission method, a HARQ feedback-based retransmission method, which is a method of performing retransmission, based on HARQ ACK/NACK feedback, as well as a blind retransmission method, which is a method of performing retransmission without being based on HARQ feedback information, may be supported. When the terminal measures CR, not only the record in which the channel is occupied and used in the past, based on the current time point, but also the part in which the channel is granted to be occupied and used in the future may be reflected together. In the case of the retransmission method, based on HARQ ACK/NACK feedback, when transmitting terminal reserves the resource to occupy and use it in the future, but an ACK is reported from the receiving terminal, the resource occupied for retransmission may be released because retransmission might not be performed. Therefore, this part should be reflected in CR measurement. Hereinafter, in the disclosure, embodiments for performing congestion control in the NR sidelink will be described below.

Various embodiments are to perform congestion control in a process in which a vehicle terminal supporting V2X transmits and receives information using a sidelink with another vehicle terminal and a pedestrian portable terminal. Specifically, the transmitting terminal may determine whether the channel is congested by measuring the CBR and CR, and determine whether the channel is connected to the terminal and the configuration range of the transmission parameter according to the determination result. Also, in the disclosure, the operation of the base station and the operation of the terminal according to various embodiments are described below.

Figure 1B:
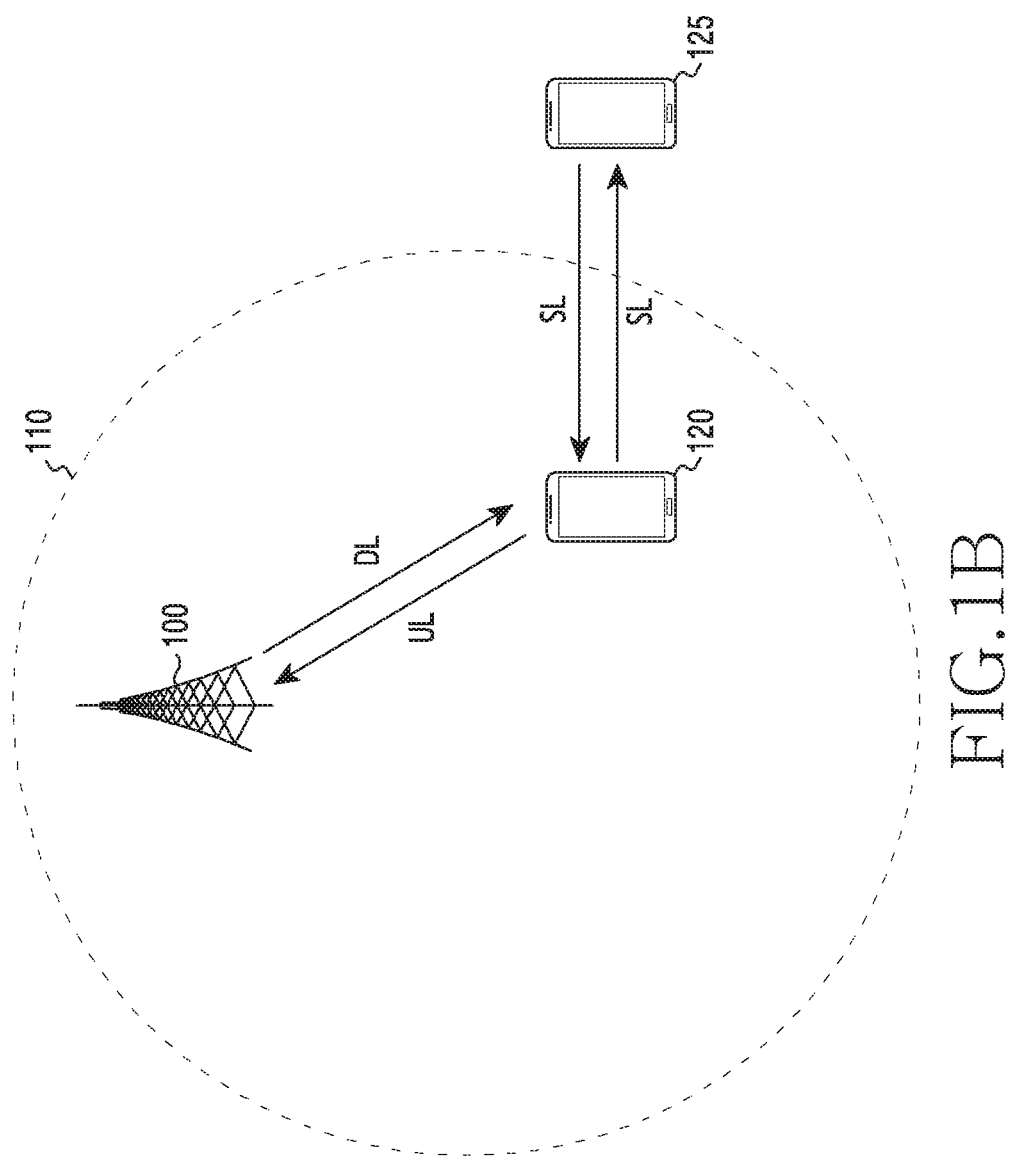
FIG. 1B illustrates a scenario for sidelink communication in a wireless communication system according to an embodiment of the disclosure.
Figure 1C:
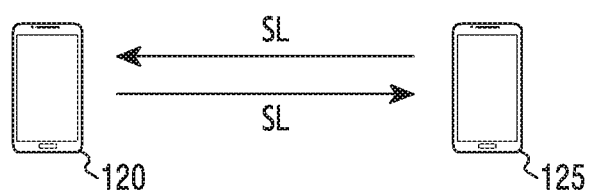
FIG. 1C illustrates a scenario for sidelink communication in a wireless communication system according to an embodiment of the disclosure.
Figure 1D:
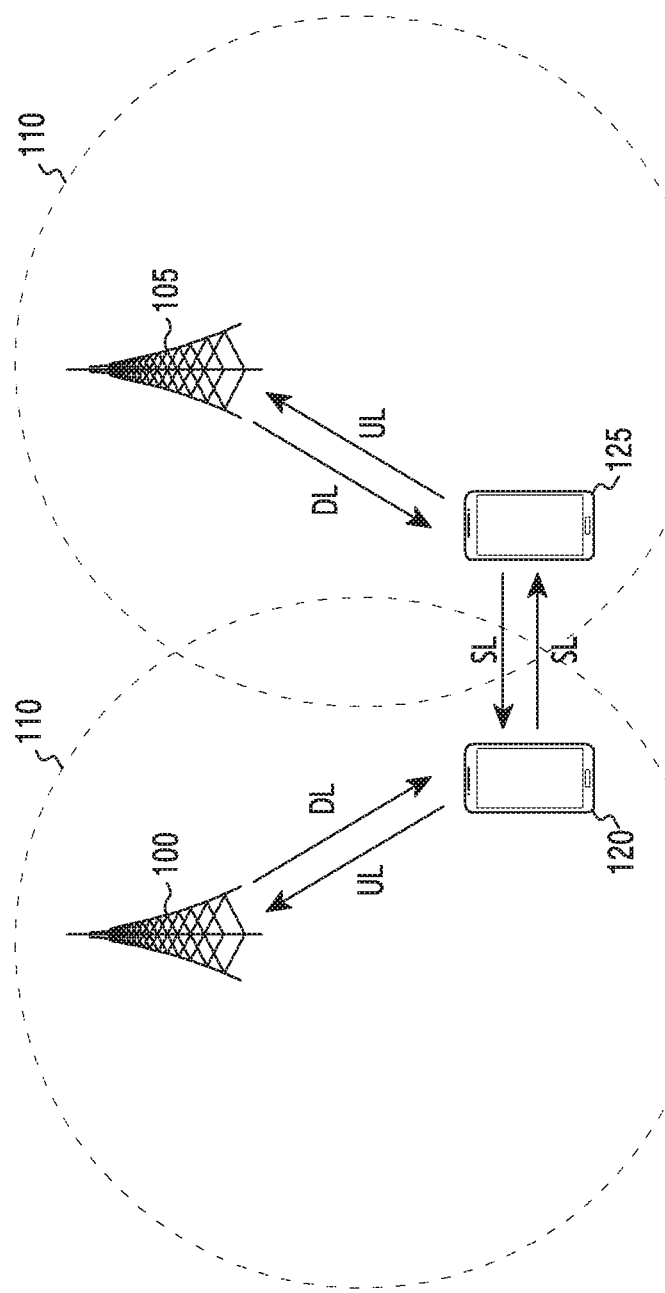
FIG. 1D illustrates a scenario for sidelink communication in a wireless communication system according to an embodiment of the disclosure.

FIG. 1A illustrates a scenario for sidelink communication in a wireless communication system according to an embodiment of the disclosure. FIG. 1B illustrates a scenario for sidelink communication in a wireless communication system according to an embodiment of the disclosure. FIG. 1C illustrates a scenario for sidelink communication in a wireless communication system according to an embodiment of the disclosure. FIG. 1D illustrates a scenario for sidelink communication in a wireless communication system according to an embodiment of the disclosure.

Referring to FIG. 1A, an in-coverage (IC) scenario where sidelink terminals 120 and 125 are located within the coverage 110 of a base station 100 is illustrated. The sidelink terminals 120 and 125 may receive data and control information via a downlink (DL) from a base station, or transmit data and control information via an uplink (UL) to a base station. In this case, the data and control information may be data and control information for sidelink communication, or data and control information for general cellular communication rather than sidelink communication. In addition, in FIG. 1A, the sidelink terminals 120 and 125 may transmit and receive data and control information for sidelink communication via the sidelink.

Referring to FIG. 1B, a case of partial coverage (PC), where the first terminal 120 among sidelink terminals is located within the coverage 110 of the base station 100 and the second terminal 125 is located outside the coverage 110 of the base station 100 is illustrated. The first terminal 120 located within the coverage 110 of the base station 100 may receive data and control information from the base station via a downlink or transmit data and control information to the base station via the uplink. The second terminal 125 located outside the coverage of the base station 100 cannot receive data and control information from the base station via a downlink, and cannot transmit data and control information to the base station via an uplink. The second terminal 125 may transmit and receive data and control information for sidelink communication with the first terminal 120 via a sidelink.

Referring to FIG. 1C, a case in which sidelink terminals (e.g., the first terminal 120 and the second terminal 125) are located outside the coverage (OOC) 110 of the base station 100 is illustrated. Therefore, the first terminal 120 and the second terminal 125 cannot receive data and control information from a base station via a downlink, and cannot transmit data and control information to a base station via an uplink. The first terminal 120 and the second terminal 125 may transmit and receive data and control information for sidelink communication via a sidelink.

Referring to FIG. 1D, a case of performing inter-cell sidelink communication, in which the first terminal 120 and the second terminal 125 performing sidelink communication are connected to different base stations (e.g., a first base station (i.e., the base station 100) and a second base station 105) (e.g., RRC connection state) or are camping (e.g., RRC connection release state, that is, RRC idle state) is illustrated. In this case, the first terminal 120 may be a sidelink transmitting terminal, and the second terminal 125 may be a sidelink receiving terminal. Alternatively, the first terminal 120 may be a sidelink receiving terminal, and the second terminal 125 may be a sidelink transmitting terminal. The first terminal 120 may receive a sidelink dedicated system information block (SIB) from the base station 100 to which the first terminal 120 is connected (or is camping), and the second terminal 125 may receive a sidelink dedicated SIB from the second base station 105 to which the second terminal 125 is connected (or is camping). At this time, the sidelink dedicated SIB information received by the first terminal 120 and the sidelink dedicated SIB information received by the second terminal 125 may be different from each other. Accordingly, in order to perform sidelink communication between terminals located in different cells, information may be required to be unified, or assumptions and interpretation methods therefor may be additionally required.

In the examples of FIGS. 1A to 1D, for convenience of description, a sidelink system including two terminals (e.g., the first terminal 120 and the second terminal 125) has been described as an example, but the disclosure is not limited thereto, and may be applied to a sidelink system in which three or more terminals participate. In addition, the uplink and downlink between the base station 100 and the sidelink terminals may be referred to as a Uu interface, and the sidelink between the sidelink terminals may be referred to as a PC5 interface. In the following description, uplink or downlink and Uu interface, sidelink and PC5 may be used interchangeably.

Meanwhile, in the disclosure, the terminal may mean a vehicle that supports vehicle-to-vehicle (V2V) communication, a vehicle or pedestrian handset that supports vehicle-to-pedestrian (V2P) communication (e.g., a smartphone), a vehicle that supports vehicle-to-network (V2N) communication, or a vehicle that supports vehicle-to-infrastructure (V2I) communication. In addition, in the disclosure, the terminal may mean a road side unit (RSU) equipped with a terminal function, an RSU equipped with a base station function, or an RSU equipped with a part of the base station function and a part of the terminal function.

Further, in the disclosure, the base station may be a base station supporting both V2X communication and general cellular communication, or a base station supporting only V2X communication. At this time, the base station may be a 5G base station (gNB), a 4G base station (eNB), or an RSU. Accordingly, in this disclosure, the base station may be referred to as an RSU.

Figure 2A:
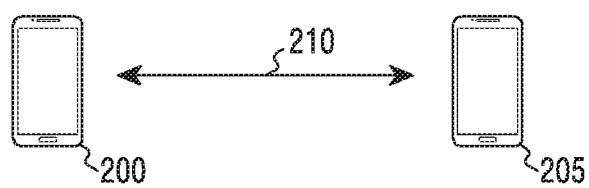
FIG. 2A illustrates a transmission method of sidelink communication in a wireless communication system according to an embodiment of the disclosure.
Figure 2B:
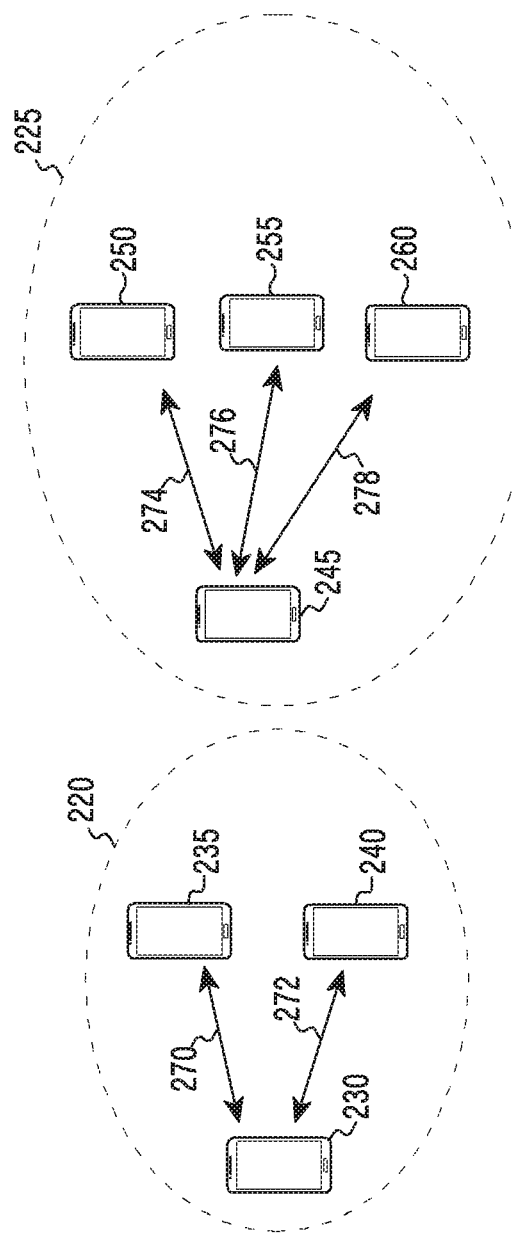
FIG. 2B illustrates a transmission method of sidelink communication in a wireless communication system according to an embodiment of the disclosure.

FIG. 2A illustrates a transmission method of sidelink communication in a wireless communication system according to an embodiment of the disclosure. FIG. 2B illustrates a transmission method of sidelink communication in a wireless communication system according to an embodiment of the disclosure. FIG. 2A illustrates a unicast scheme, and FIG. 2B illustrates a groupcast scheme.

Referring to FIG. 2A, a transmitting terminal 200 and a receiving terminal 205 may perform one-to-one communication 210. The transmission scheme shown in FIG. 2A may be referred to as unicast communication 210.

Referring to FIG. 2B, the transmitting terminal 230 or 245 and the receiving terminals 235, 240, 250, 255, or 260 may perform one-to-many communication 270, 272, 274, 276, and 278. The transmission scheme shown in FIG. 2B may be referred to as groupcast or multicast. Referring to FIG. 2B, the first terminal 230, the second terminal 235, and the third terminal 240 form one group and perform groupcast communication, and the fourth terminal 245, the fifth terminal 250, the sixth terminal 255, and the seventh terminal 260 form another group and perform groupcast communication. The terminals may perform groupcast communication within a group to which they belong, and perform unicast, groupcast, or broadcast communication with at least one other terminal belonging to different groups. Referring to FIG. 2B, two groups are illustrated, but the disclosure is not limited thereto, and can be applied even when a larger number of groups are formed.

Meanwhile, although not shown in FIG. 2A or FIG. 2B, the sidelink terminals may perform broadcast communication. The broadcast communication refers to a method in which all sidelink terminals receive data and control information transmitted by the sidelink transmission terminal via the sidelink. For example, in FIG. 2B, if the first terminal 230 is a transmitting terminal, the remaining terminals 235, 240, 245, 250, 255, and 260 may receive data and control information transmitted by the first terminal 230.

The above-described sidelink unicast communication, groupcast communication, and broadcast communication may be supported in an in-coverage scenario, a partial-coverage scenario, or an out-of-coverage scenario.

In the case of the NR sidelink, unlike in the LTE sidelink, support of a transmission type in which a vehicle terminal transmits data to only one specific terminal via unicast and a transmission type in which data is transmitted to a specific plurality of terminals via groupcast may be considered. For example, when considering a service scenario, such as platooning, which is a technique of connecting two or more vehicles with a single network and moving in a cluster form, this unicast and groupcast technique can be usefully used. Specifically, unicast communication may be used for the purpose of controlling one specific terminal by a leader terminal of a group connected by flattening, and groupcast communication may be used for the purpose of simultaneously controlling a group of a plurality of terminals.

Figure 3:
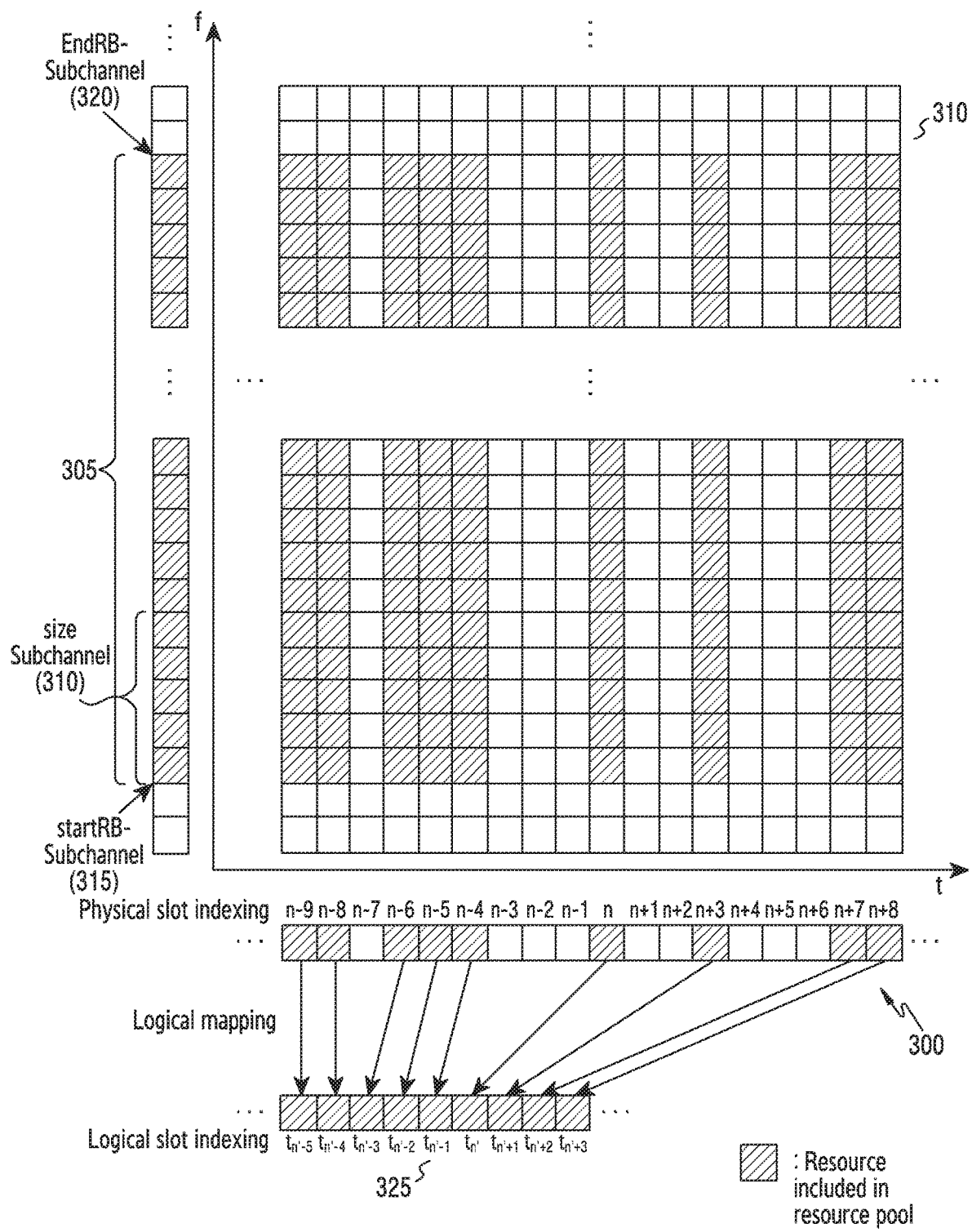
FIG. 3 illustrates a sidelink resource pool in a wireless communication system according to an embodiment of the disclosure.

FIG. 3 illustrates a sidelink resource pool in a wireless communication system according to an embodiment of the disclosure. The resource pool can be defined as a set of resources in the time and frequency domains used for transmission and reception of sidelinks.

The resource granularity of the time axis in the resource pool may be one or more orthogonal frequency division multiplexing (OFDM) symbols. In addition, the resource granularity of the frequency axis may be one or more physical resource blocks (PRBs).

When a resource pool is allocated in a time domain and a frequency domain, an area including shaded resources represents an area configured as a resource pool on the time and frequency domains. In the disclosure, the case in which the resource pool is non-contiguously allocated on the time domain is described, but the disclosure is not limited thereto and can be applied even when the resource pool is continuously allocated on the time domain. Further, in the disclosure, the case in which the resource pool is continuously allocated on the frequency domain is described, but the disclosure is not limited thereto, and the disclosure can also be applied when the resource pool is non-continuously allocated on the frequency domain.

Referring to FIG. 3, a time domain 300 of the configured resource pool exemplifies a case where resources are non-contiguously allocated on the time domain. On the time domain 300 of the resource pool, the resource granularity on the time axis may be a slot. Specifically, one slot including 14 OFDM symbols may be a basic resource granularity on the time axis. Referring to the time domain 300 of the configured resource pool, shaded slots indicate slots allocated as a resource pool on the time domain, and slots allocated as a resource pool on the time domain can be indicated using system information. For example, slots allocated as a resource pool on the time domain may be indicated using resource pool configuration information on the time domain in the SIB. Specifically, at least one slot configured as a resource pool on the time domain may be indicated via a bitmap. Referring to FIG. 3, physical slots (e.g., the time domain 300) belonging to a non-contiguous resource pool on the time axis may be mapped to logical slots 325. In general, a set of slots belonging to a resource pool for a physical sidelink shared channel (PSSCH) may be expressed as $t_0, t_1, \ldots, t_i, \ldots, t_{Tmax}$.

Referring to FIG. 3, a frequency domain 305 of the configured resource pool exemplifies a case where resources are continuously allocated in the frequency domain. In the frequency domain 305 of the resource pool, the resource granularity on a frequency axis may be a subchannel 310. Specifically, one subchannel 310 including one or more resource blocks (RBs) may be defined as a basic resource granularity on frequency. For example, the subchannel 310 may be defined as an integer multiple of RB. Referring to FIG. 3, the size of the subchannel (sizeSubchannel) may be including five consecutive PRBs, but the disclosure is not limited thereto, and the size of the subchannel may be configured differently. In addition, one subchannel is generally including consecutive PRBs, but is not necessarily including continuous PRBs. The subchannel 310 may be a basic resource granularity for the PSSCH. In addition, a subchannel for a physical sidelink feedback channel (PSFCH) may be defined independently of the PSSCH.

Referring to FIG. 3, a starting position of a subchannel 3-31 on a frequency domain in a resource pool may be indicated by startRB-Subchannel 315. When resource allocation is performed on the frequency axis in units of subchannels 310, resource pool configuration on the frequency domain may be performed via the RB index (startRB-Subchannel) 315 starting from the subchannel 310, information (sizeSubchannel) for indicating how many RBs the subchannel 310 is composed of, and configuration information for the total number of subchannels 310 (numSubchannel). According to various embodiments of the disclosure, subchannels allocated to a resource pool on a frequency domain may be indicated using system information. For example, at least one of startRB-Subchannel, sizeSubchannel, and numSubchannel may be indicated as frequency resource pool configuration information in SIB. When the subchannel for the PSFCH is defined independently of the PSSCH, the subchannel configuration information of the PSFCH and the PSSCH may be indicated respectively.

Figure 4:
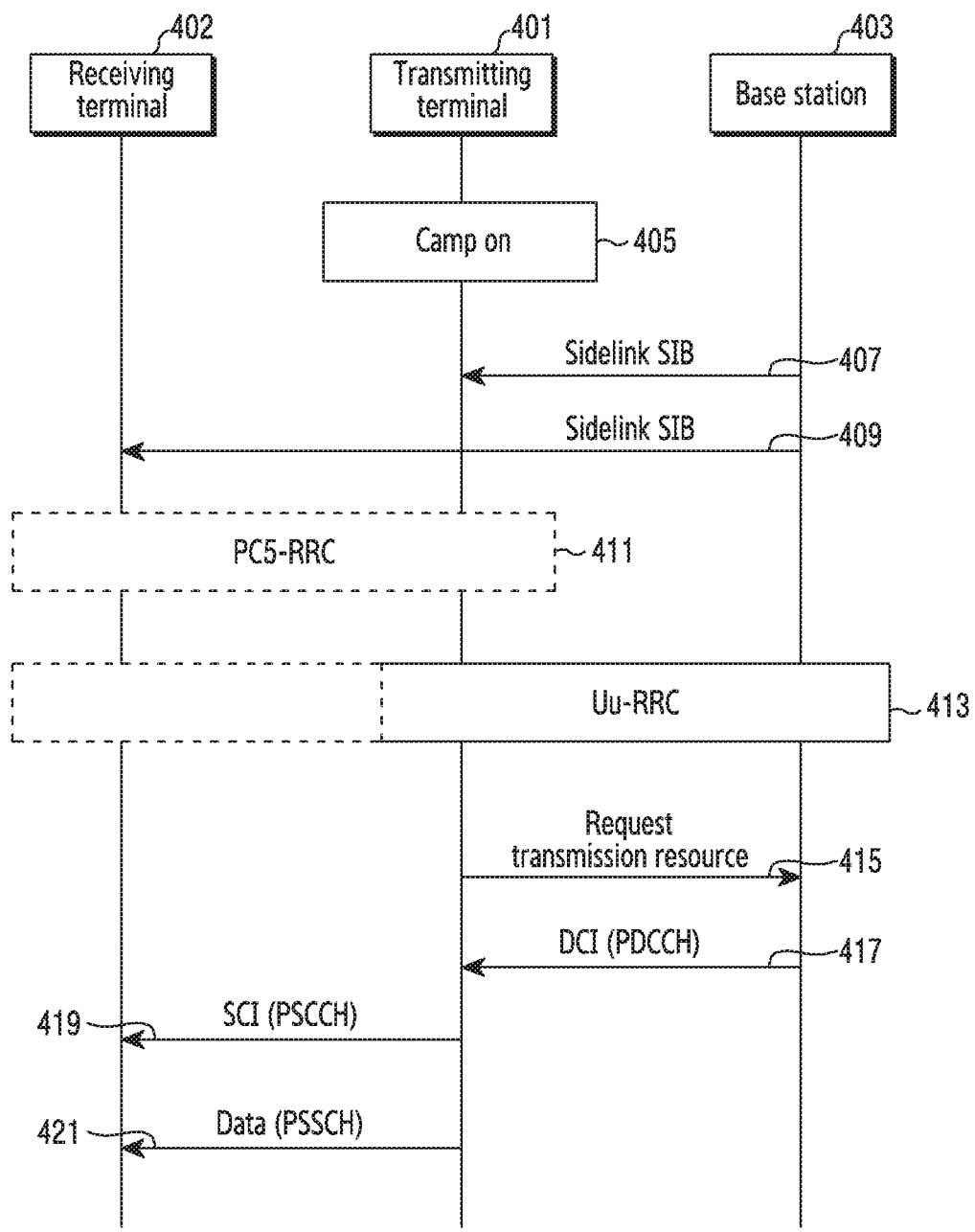
FIG. 4 illustrates a signal flow for allocating sidelink transmission resources in a wireless communication system according to an embodiment of the disclosure.

FIG. 4 illustrates a signal flow for allocating sidelink transmission resources in a wireless communication system according to an embodiment of the disclosure. FIG. 4 illustrates signal exchanges between a transmitting terminal 401, a receiving terminal 402, and a base station 403.

As described below, a method in which the base station allocates transmission resources for sidelink communication may be referred to as mode 1. Mode 1 is a scheme based on scheduled resource allocation by the base station. More specifically, in mode 1 resource allocation, the base station may allocate resources used for sidelink transmission according to a dedicated scheduling method to the RRC connected terminals. Since the base station can manage the resources of the sidelink, the scheduled resource allocation is advantageous for interference management and resource pool management (e.g., dynamic allocation and/or semi-persistent transmission).

Referring to FIG. 4, in operation 407, the transmitting terminal 401 camping on (405) may receive the sidelink SIB from the base station 403. In operation 409, the receiving terminal 402 may receive a side link system information block (SIB) from the base station 403. Here, the receiving terminal 402 means a terminal that receives data transmitted by the transmitting terminal 401. The sidelink SIB may be transmitted periodically or on demand. In addition, the sidelink SIB may include at least one of sidelink resource pool information for sidelink communication, parameter configuration information for sensing operation, information for configuring sidelink synchronization, or carrier information for sidelink communication operating at different frequencies. Although operations 407 and 409 have been sequentially described above, this is for convenience of explanation, and operations 407 and 409 may be performed in parallel.

In operation 413, when data traffic for sidelink communication is generated in the transmitting terminal 401, the transmitting terminal 401 may be RRC connected to the base station 403. Here, the RRC connection between the transmitting terminal 401 and the base station 403 may be referred to as Uu-RRC. The Uu-RRC connection may be performed before data traffic is generated by the transmitting terminal 401. In addition, in the case of mode 1, in a state in which a Uu-RRC connection is made between the base station 403 and the receiving terminal 402, the transmitting terminal 401 may perform transmission to the receiving terminal 402 via a side link. In addition, in the case of mode 1, even when a Uu-RRC connection is not made between the base station 403 and the receiving terminal 402, the transmitting terminal 401 may perform transmission to the receiving terminal 402 via a side link.

In operation 415, the transmitting terminal 401 may request the base station 403 to transmit resources for performing side link communication with the receiving terminal 402. In this case, the transmitting terminal 401 may request the base station 403 to transmit resources for the sidelink using at least one of an uplink physical uplink control channel (PUCCH), an RRC message, or a media access controller (MAC) control element (CE). For example, when MAC CE is used, MAC CE may be a MAC CE for a buffer status report (BSR) having a new format including at least one of an indicator for indicating that it is a buffer status report for sidelink communication and information about the size of data buffered for device-to-device (D2D) communication. In addition, when PUCCH is used, the transmitting terminal 401 may request a sidelink resource via a bit of a scheduling request (SR) transmitted via an uplink physical control channel.

In operation 417, the base station 403 may transmit downlink control information (DCI) to the transmitting terminal 401 via a PDCCH. For example, the base station 403 may indicate the transmitting terminal 401 to finalize scheduling for sidelink communication with the receiving terminal 402. More specifically, the base station 403 may allocate a sidelink transmission resource to the transmitting terminal 401 according to at least one of a dynamic grant scheme or a configured grant (CG) scheme.

In the case of the dynamic grant scheme, the base station 403 may allocate resources for one transport block (TB) transmission by transmitting DCI to the transmitting terminal 401. The sidelink scheduling information included in the DCI may include parameters related to an initial transmission time and/or transmission time of retransmission, and parameters related to a frequency allocation location information field. The DCI for the dynamic grant scheme may be scrambled by a cyclic redundancy check (CRC), based on a sidelink-V2X-radio network temporary identifier (SL-V-RNTI) to indicate that the transmission resource allocation scheme is a dynamic grant scheme.

In the case of the configured grant scheme, a resource for transmitting a plurality of TBs may be periodically allocated by configuring a semi-persistent scheduling (SPS) interval in Uu-RRC. In this case, the base station 403 may allocate resources for a plurality of TBs by transmitting DCI to the transmitting terminal 401. The sidelink scheduling information included in the DCI may include parameters related to an initial transmission time and/or transmission time of retransmission, and parameters related to a frequency allocation location information field. In the case of the configured grant scheme, an initial transmission time (occasion) and/or a transmission time and frequency allocation location of retransmission may be determined according to the transmitted DCI, and the resource may be repeated at SPS intervals. The DCI for the configured grant scheme may be CRC scrambled based on SL-SPS-V-RNTI to indicate that the transmission resource allocation scheme is the configured grant scheme. In addition, the configured grant scheme may be divided into a type 1 CG and a type 2 CG. In the case of type 2 CG, the base station 403 may activate and/or deactivate the resource configured by the configuration grant via DCI. Therefore, in the case of mode 1, the base station 403 may transmit the DCI via the PDCCH, thereby indicating the transmitting terminal 401 to finally schedule for sidelink communication with the receiving terminal 402.

When broadcast transmission is performed between the receiving terminals 401 and 402, in operation 419, the transmitting terminal 401 may broadcast the SCI to the receiving terminal 402 via the PSCCH without RRC configuration (operation 411) of an additional sidelink. In addition, in operation 421, the transmitting terminal 401 may broadcast data to the receiving terminal 402 via the PSSCH.

When unicast or groupcast transmission is performed between the receiving terminals 401 and 402, in operation 411, the transmitting terminal 401 may perform an RRC connection one-to-one with other terminals (e.g., the receiving terminal 402). In this case, in order to distinguish from the Uu-RRC, the RRC connection between the receiving terminals 401 and 402 may be referred to as PC5-RRC. In the case of the groupcast transmission scheme, PC5-RRC connection may be individually established between a terminal in the group and a terminal. Referring to FIG. 4, the connection of the PC5-RRC (operation 411) is shown as an operation after the transmission of the sidelink SIB (operations 407 and 409), but the connection of the PC5-RRC be performed before the transmission of the sidelink SIB or before broadcast of the SCI (operation 419). If RRC connection between terminals is required, the PC5-RRC connection of the sidelink may be performed, and in operation 419, the transmitting terminal 401 may transmit the SCI to the receiving terminal 402 via the PSCCH in unicast or groupcast. At this time, the groupcast transmission of the SCI may be understood as the group SCI. In addition, in operation 421, the transmitting terminal 401 may transmit data to the receiving terminal 402 via a PSSCH in unicast or groupcast. In the case of mode 1, the transmitting terminal 401 may identify sidelink scheduling information included in the DCI received from the base station 403 and perform scheduling for the sidelink based on the sidelink scheduling information. The SCI may include the following scheduling information.

Fields related to transmission timing and frequency allocation location information of initial transmission and retransmission
 New data indicator (NDI) field
 Redundancy version (RV) field
 Information field to indicate reservation interval
 In the information field for indicating a reservation interval, when resources for a plurality of TBs (i.e., multiple media access controller (MAC) protocol data units (PDUs)) are selected, the interval between TBs is indicated by a fixed one value, and when a resource for one TB is selected, '0' may be indicated as the interval value between TBs.

Figure 5:
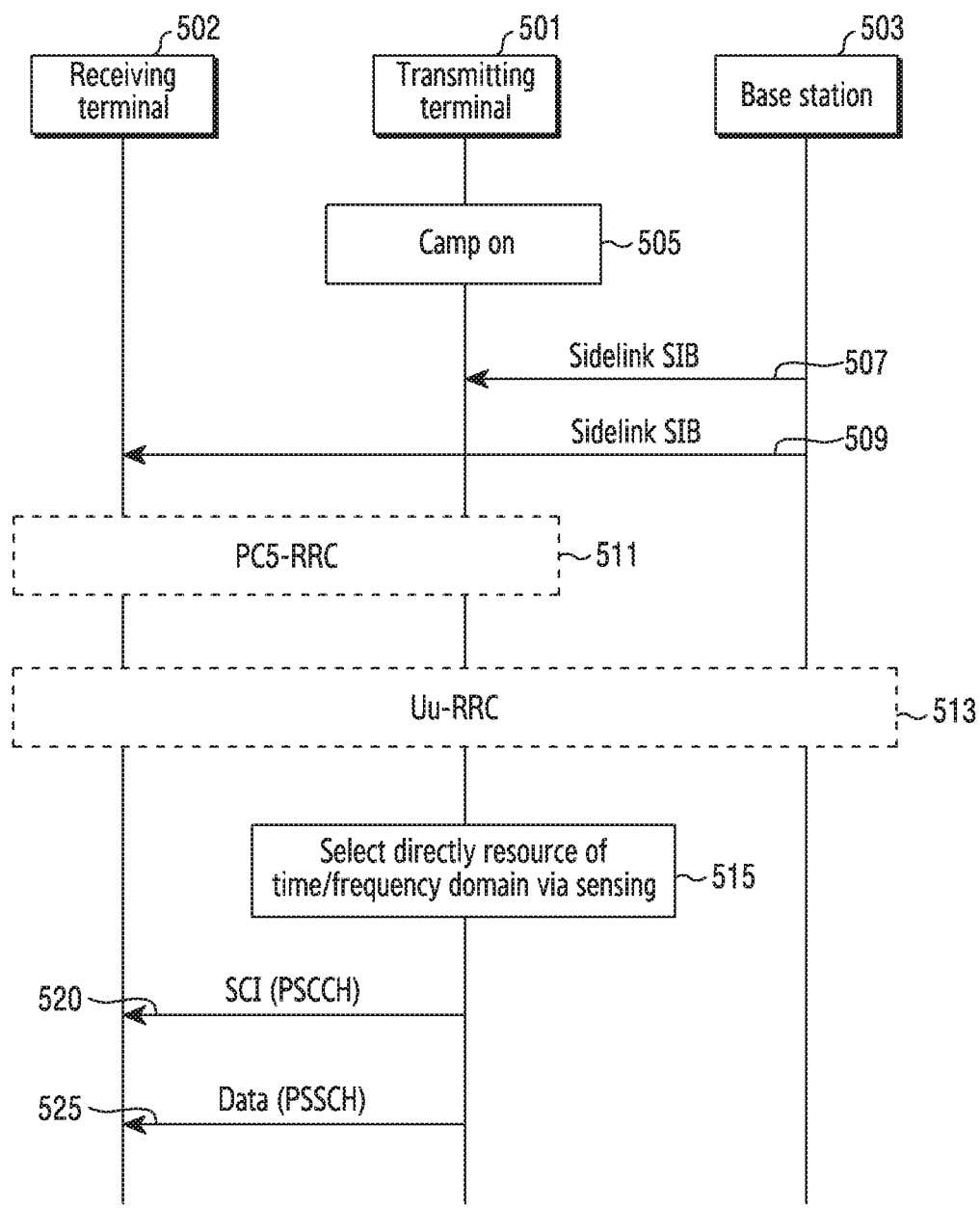
FIG. 5 illustrates a signal flow for allocating transmission resources of a sidelink in a wireless communication system according to an embodiment of the disclosure.

FIG. 5 illustrates a signal flow for allocating transmission resources of a sidelink in a wireless communication system according to an embodiment of the disclosure. FIG. 5 illustrates signal exchanges between a transmitting terminal 501, a receiving terminal 502, and a base station 503.

As described below, a method in which a terminal directly allocates transmission resources of a sidelink via sensing in a sidelink may be referred to as mode 2. Mode 2 may be referred to as UE autonomous resource selection. Specifically, according to mode 2, the base station 503 provides the sidelink transmission/reception resource pool for the sidelink to the terminal as system information or an RRC message (e.g., RRC reconfiguration message, PC5 RRC message), and the transmitting terminal 501 selects a resource pool and resources according to the determined rules. Unlike mode 1 in which the base station directly participates in resource allocation, mode 2 described in FIG. 5 may autonomously select a resource and transmit data based on a resource pool previously received by the transmitting terminal 501 via system information.

Referring to FIG. 5, in operation 507, the transmitting terminal 501 camping on 505 may receive a sidelink SIB from the base station 503. In operation 509, the receiving terminal 502 may receive the sidelink SIB from the base station 503. Here, the receiving terminal 502 means a terminal that receives data transmitted by the transmitting terminal 501. The sidelink SIB may be transmitted periodically or on demand. In addition, the sidelink SIB information may include at least one of sidelink resource pool information for sidelink communication, parameter configuration information for sensing operation, information for configuring sidelink synchronization, or carrier information for sidelink communication operating at different frequencies. Although operations 507 and 509 have been sequentially described above, this is for convenience of description, and operations 507 and 509 may be performed in parallel.

In the case of FIG. 4 described above, while the base station 503 and the transmitting terminal 501 operate in a state where the RRC is connected, in FIG. 5, the base station 503 and the transmitting terminal 501 may operate regardless of whether the RRC between the base station 503 and the transmitting terminal is connected, in operation 513. For example, the base station 503 and the transmitting terminal 501 may operate even in an idle mode 513 in which the RRC is not connected. In addition, even when the RRC is connected, the base station 503 may operate to autonomously select a transmission resource by the transmitting terminal 501 without directly participating in resource allocation. In this case, the RRC connection between the transmitting terminal 501 and the base station 503 may be referred to as Uu-RRC.

In operation 515, when data traffic for sidelink communication is generated in the transmitting terminal 501, the transmitting terminal 501 may be configured a resource pool via the system information received from the base station 503 and directly select time and frequency domain resources via sensing within the configured resource pool.

When broadcast transmission is performed between the transmitting terminal 501 and the receiving terminal 502, in operation 520, the transmitting terminal 501 may broadcast the SCI to the receiving terminal 502 via the PSCCH without RRC configuration (operation 513) of an additional sidelink. In addition, in operation 525, the transmitting terminal 501 may broadcast data to the receiving terminal 502 via the PSSCH.

When unicast and groupcast transmission is performed between the transmitting terminal 501 and the receiving terminal 502, in operation 511, the transmitting terminal 501 may perform an RRC connection one-to-one with other terminals (e.g., the receiving terminal 502). In this case, in order to distinguish from Uu-RRC, RRC connection between transmitting terminal 501 and the receiving terminal 502 may be referred to as PC5-RRC. In the case of the groupcast transmission scheme, PC5-RRC connection is individually established between terminals in the group. Referring to FIG. 5, although the PC5-RRC connection (operation 511) is shown as an operation after the transmission of the sidelink SIB (operation 507, operation 509), it may be performed before the transmission of the sidelink SIB or before the transmission of the SCI (operation 520). If RRC connection between terminals is required, the PC5-RRC connection of the sidelink is performed, and in operation 520, the transmitting terminal 501 may transmit the SCI to the receiving terminal 502 via the PSCCH in unicast or groupcast. At this time, the groupcast transmission of the SCI may be understood as the group SCI. In addition, in operation 525, the transmitting terminal 501 may transmit data to the receiving terminal 502 via the PSSCH in unicast or groupcast. In the case of mode 2, the transmitting terminal 501 can directly perform scheduling for the sidelink by performing sensing and transmission resource selection operations. The SCI may include the following scheduling information.

Transmission time and frequency allocation location information fields of initial transmission and retransmission New data indicator (NDI) field Redundancy version (RV) field Information field to indicate reservation interval The information field for indicating the reservation interval, when a resource for a plurality of TBs (i.e., a plurality of MAC PDUs) is selected, an interval between TBs is indicated by a fixed value, and when a resource for one TB is selected, '0' may be indicated as an interval value between TBs.

Figure 6:
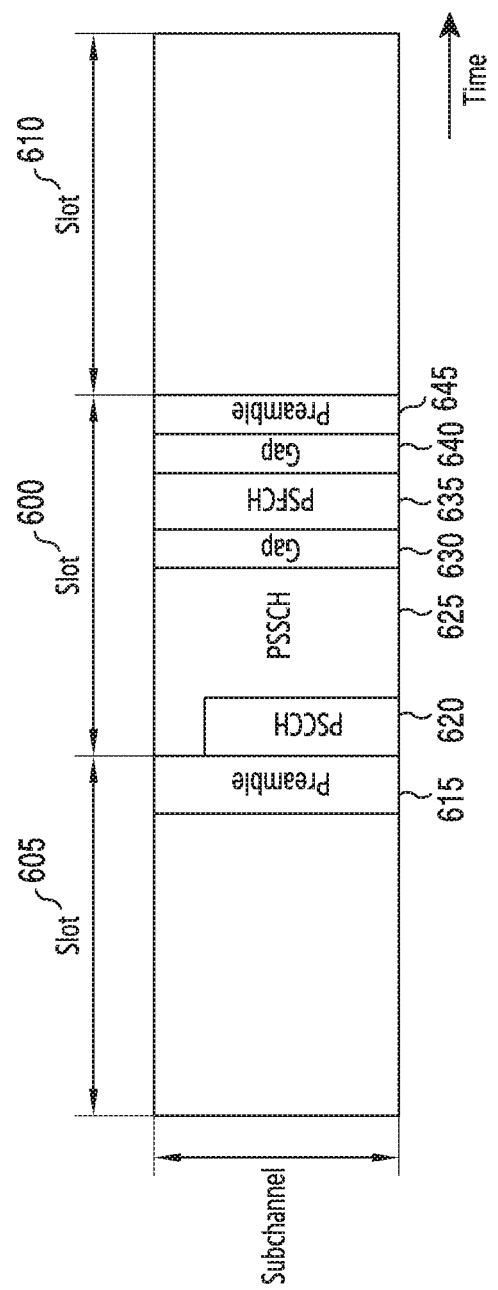
FIG. 6 illustrates a channel structure of a slot used for sidelink communication in a wireless communication system according to an embodiment of the disclosure.

FIG. 6 illustrates a channel structure of a slot used for sidelink communication in a wireless communication system according to embodiment of the disclosure. FIG. 6 illustrates physical channels mapped to slots for sidelink communication.

Referring to FIG. 6, a preamble 615 is mapped before the start of a slot 600, that is, after the previous slot 605. Thereafter, from the start of slot 600, PSCCH 620, PSSCH 625, gap 630, PSFCH 635, gap 640, and preamble 645 are mapped.

Before transmitting the signal in the corresponding slot 600, the transmitting terminal transmits the preamble 615 in one or more symbols. The preamble 615 may be used to allow the receiving terminal to correctly perform automatic gain control (AGC) for adjusting the intensity of amplification when amplifying the power of the received signal. Also, the preamble 615 may or might not be transmitted depending on whether the previous slot 605 of the transmitting terminal is transmitted. For example, when the transmitting terminal transmits a signal to the same terminal in the previous slot (e.g., slot 605) of the corresponding slot (e.g., slot 600), transmission of the preamble 615 may be omitted. The preamble 615 may be referred to a 'synchronization signal', a 'sidelink synchronization signal', a 'sidelink reference signal', a 'midamble', an 'initial signal', a 'wake-up signal', or another term having equivalent technical meaning.

The PSCCH 620 including the control information may be transmitted using symbols transmitted at the beginning of the slot, and the PSSCH 625 scheduling the control information of the PSCCH 620 may be transmitted. The PSSCH 625 may be mapped to at least a part of the control information SCI. Thereafter, the gap 630 exists, and the PSFCH 635 which is a physical channel for transmitting feedback information may be mapped.

In the case of FIG. 6, the PSFCH 635 is illustrated as being located at the end of the slot. By securing the gap 630 which is an empty time of a predetermined time between the PSSCH 625 and the PSFCH 635, the terminal that has transmitted or received the PSSCH 625 may prepare for transmitting or receiving the PSFCH 635 (e.g., switching transmission/reception). After the PSFCH 635, a gap 640, which is an empty section for a predetermined time, exists.

The terminal may be preconfigured in the slot location for transmitting the PSFCH. Receiving in advance may be determined in advance in the process of fabricating a terminal, or transmitted when connected to a sidelink-related system, or transmitted from a base station when connected to a base station, or received from another terminal.

In the embodiment of FIG. 6, it has been described that a preamble signal for performing AGC is performed separately in a physical channel structure in a sidelink slot. However, according to another embodiment of the disclosure, a separate preamble signal is not transmitted, and while receiving a physical channel for transmission of control information or data, a receiver of a receiving terminal may also operate AGC using a control degree or a physical channel for data transmission.

Figure 7A:
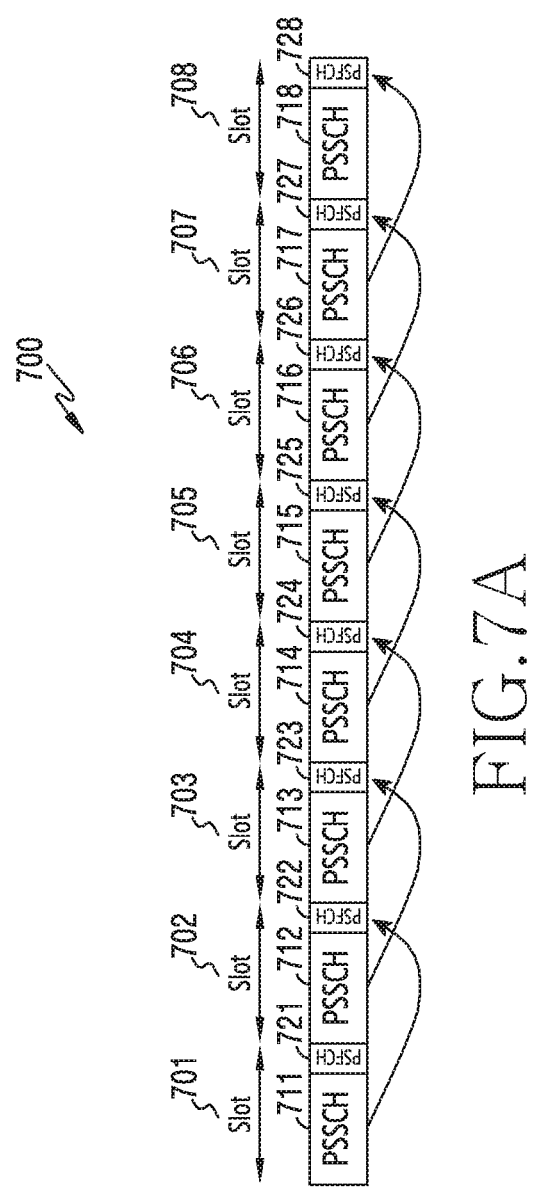
FIG. 7A illustrates a distribution of a feedback channel in a wireless communication system according to an embodiment of the disclosure.

FIG. 7A illustrates a distribution 700 of a feedback channel in a wireless communication system according to an embodiment of the disclosure. FIG. 7A illustrates a case in which resources capable of transmitting and receiving PSFCH are allocated in each slot.

Referring to FIG. 7A, an arrow indicates a slot of the PSFCH in which HARQ-ACK feedback information corresponding to the PSSCH is transmitted. Referring to FIG. 7A, HARQ-ACK feedback information for the PSSCHs 711, 712, 713, 714, 715, 716, 717, and 718 transmitted in the slots 701, 702, 703, 704, 705, 706, 707, and 708 is transmitted in the PSFCHs 721, 722, 723, 724, 725, 726, 727, and 728 of the corresponding slots. Since the PSFCH is allocated to every slot, the PSFCH may correspond 1:1 with the slot including the PSSCH. For example, when configuring a period of a resource capable of transmitting and receiving PSFCH by a parameter, such as periodicity_PSFCH_resource, in FIG. 7A, the periodicity_PSFCH_resource indicates 1 slot. Alternatively, the period may be configured in units of msec, and the period may be indicated as a value assigned to each slot according to subcarrier spacing (SCS).

Figure 7B:
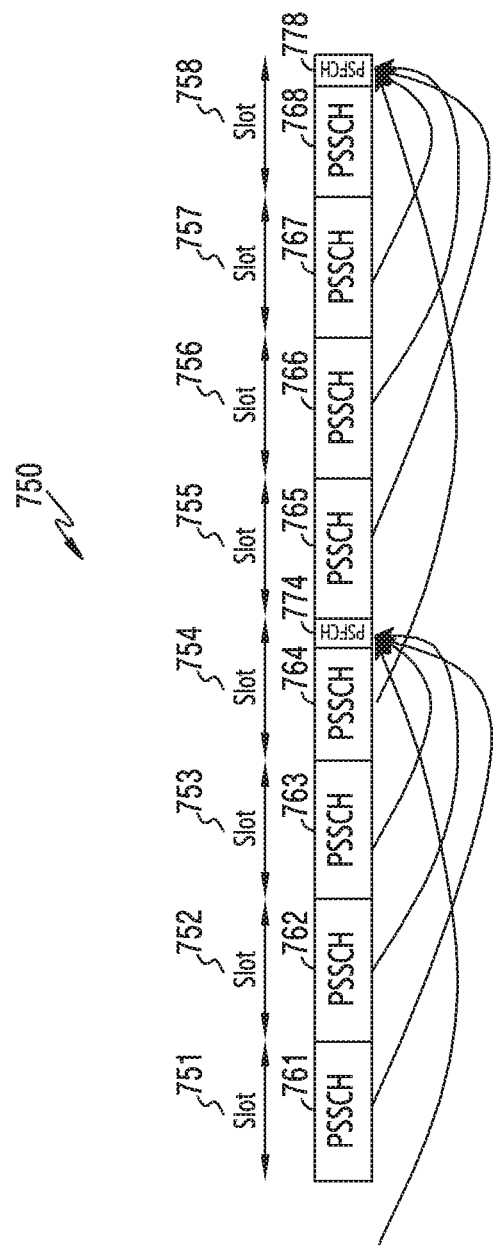
FIG. 7B illustrates a distribution of a feedback channel in a wireless communication system according to an embodiment of the disclosure.

FIG. 7B illustrates a distribution 750 of a feedback channel in a wireless communication system according to an embodiment of the disclosure. FIG. 7B illustrates a case in which resources are allocated to transmit and receive PSFCH for every 4 slots.

Referring to FIG. 7B, an arrow indicates a slot of the PSFCH in which HARQ-ACK feedback information corresponding to the PSSCH is transmitted. Referring to FIG. 7B, only the last slot 754 among the four slots 751, 752, 753, and 754 includes the PSFCH 774. Similarly, only the last slot 758 among the next four slots 755, 756, 757, and 758 includes the PSFCH 778. Accordingly, the HARQ-ACK feedback information for the PSSCH 761 in the slot 751, the PSSCH 762 in the slot 752, the PSSCH 763 in the slot 753, and the PSSCH 764 is transmitted from the PSFCH 774 in the slot 754. Similarly, the HARQ-ACK feedback information for the PSSCH 765 in the slot 755, the PSSCH 766 in the slot 756, and the PSSCH 767 in the slot 757 is transmitted from the PSFCH 778 in the slot 758. Here, the index of the slot may be an index of slots included in the resource pool. For example, the four slots are not physically contiguous slots, but may be slots consecutively listed among slots included in a resource pool (or slot pool) used for sidelink communication between terminals. The reason why the HARQ-ACK feedback information of the PSSCH transmitted in the fourth slot is not transmitted in the PSFCH in the same slot may be because the terminal finishes decoding the PSSCH transmitted in the corresponding slot and there is insufficient time to transmit the PSFCH in the same slot. For example, it may be because the minimum processing time required to process the PSSCH and prepare the PSFCH is not small enough.

Therefore, when a resource capable of transmitting the PSFCH in the slot n+x is configured or given, the terminal receiving the PSSCH in the slot n transmits the HARQ-ACK feedback information of the PSSCH using PSFCH of slot n+x, using the smallest x among integers greater than or equal to K. K may be a value configured in advance from the transmitting terminal or a value configured in a resource pool in which the corresponding PSSCH or PSFCH is transmitted. For configuring K, each terminal may exchange its capability information with the transmitting terminal in advance. For example, K may be determined according to at least one of a subcarrier interval, a terminal capability, a configuration value with a transmitting terminal, or a resource pool configuration.

Figure 8:
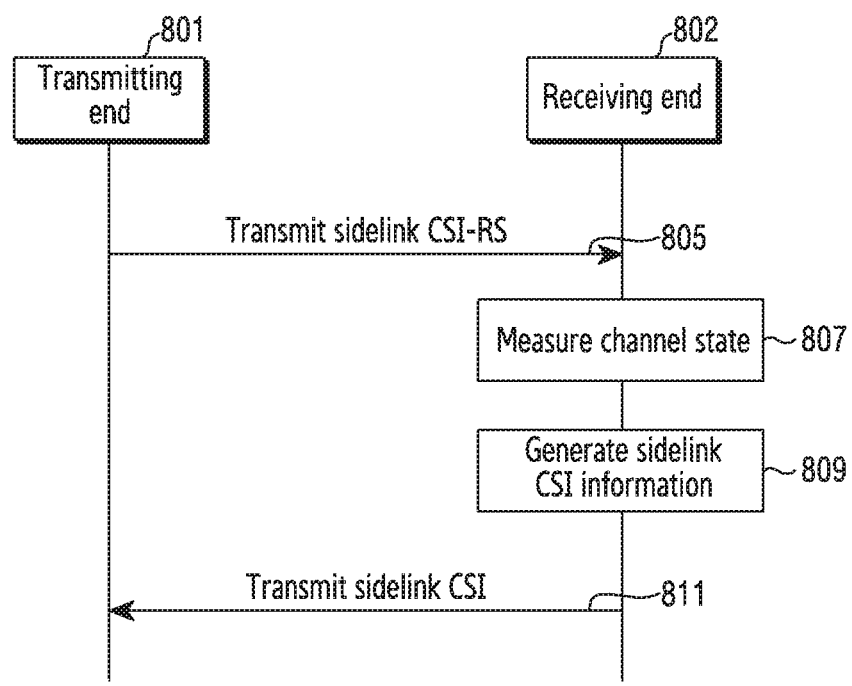
FIG. 8 illustrates a signal flow for measuring and reporting sidelink channel status in a wireless communication system according to an embodiment of the disclosure.

FIG. 8 illustrates a signal flow for measuring and reporting sidelink channel status in a wireless communication system according to an embodiment of the disclosure. FIG. 8 illustrates signal exchange between a transmitting terminal 801 and a receiving terminal 802.

Referring to FIG. 8, in operation 805, the transmitting terminal 801 transmits a side link channel state information reference signal (CSI-RS) to the receiving terminal 802. For example, the transmitting terminal 801 transmits the sidelink CSI-RS to obtain channel information from the receiving terminal 802, and the receiving terminal 802 receives the sidelink CSI-RS. In addition, the transmitting terminal 801 may request the receiving terminal 802 to report sidelink channel state information (CSI). The sidelink CSI report can be enabled or disabled.

In operation 807, the receiving terminal 802 measures the channel state of the sidelink between the transmitting terminal 801 and the receiving terminal 802 using the received sidelink CSI-RS.

In operation 809, the receiving terminal 802 generates information about the sidelink CSI using the measurement result of the channel state. For example, when sidelink CSI reporting is enabled, the receiving terminal 802 may generate information regarding the CSI measurement result for reporting to the transmitting terminal 801.

In operation 811, the receiving terminal 802 may transmit the sidelink CSI to the transmitting terminal 801. In the disclosure, sidelink CSI-RS transmission and sidelink CSI reporting are considered when unicast transmission is performed between a terminal and a terminal in the sidelink. For example, in the case of broadcast transmission, sidelink CSI-RS transmission and sidelink CSI reporting might not be supported. In addition, in the case of groupcast transmission, sidelink CSI-RS transmission for groupcast and sidelink CSI reporting method are not considered. Therefore, when the UE does not operate in unicast via PC5-RRC connection, the sidelink transmitting terminal cannot receive the SL CSI report from the receiving terminal. In addition, in the case of unicast transmission between terminals of a sidelink, only aperiodic sidelink CSI reporting is considered.

The disclosure is for performing congestion control in a side link of V2X communication, and whether the channel connection of a terminal is determined according to whether or not a corresponding channel of the side link is congested, and congestion control is performed via limitation on a configuration range of transmission parameters. For example, when the channel is congested, the terminal drops transmission or controls channel access via scheduling adjustment, and when the terminal accesses the channel, the terminal selects transmission parameters, based on the congestion status of the channel, so that the probability of successful transmission can be improved.

For congestion control, the terminal may measure a channel busy ratio (CBR). CBR is an index indicating how much the current channel is occupied by the terminals, and may be used to determine whether the corresponding channel of the sidelink is congested. CBR measured in a specific slot n may be defined as follows.

CBR is defined as a ratio of subchannels in which a sidelink received signal strength indicator (RSSI) is measured by a terminal in a resource pool exceeds a (pre-)configured threshold. Here, CBR measurement can be performed in slots [n−X, n−1], and the slot index is based on a physical slot index.

CBR measurement from a transmission point of view can be performed for the PSSCH region. Referring to FIG. 6, it is assumed that the PSSCH region and the PSCCH region are located in resource regions adjacent to each other. Here, when the frequency resource region to which the PSSCH is allocated and the frequency region to which the PSCCH is transmitted overlap, the PSSCH region and the PSCCH region are interpreted as adjacent. If the PSSCH region and the PSCCH region are not located in an adjacent resource region, CBR measurement can be performed in the PSCCH region.

According to another embodiment of the disclosure, CBR measurement from a transmission point of view may be simultaneously performed on both the PSSCH region and the PSCCH region. Referring to FIG. 6, a PSSCH associated with a part of a PSCCH is transmitted on a time resource that overlaps with a non-overlapping frequency resource, but according to another embodiment of the disclosure, there may be a case where at least a part of the PSSCH and the PSCCH related to each other are transmitted in non-overlapping time resources. Here, the term "related" means that the PSCCH includes at least information necessary to decode the PSSCH. When the PSCCH and the PSSCH are multiplexed as described above, under the assumption that the transmission power of the PSCCH region and the PSSCH region is constant and the RSSI accordingly can be measured in the PSCCH region and the PSSCH region, CBR measurement may be simultaneously performed in both regions without distinguishing the PSSCH region and the PSCCH region. Specifically, in FIG. 6, RSSI may be measured in symbols of the PSCCH region and the PSSCH region. When the PSCCH and the PSSCH are multiplexed as shown in FIG. 6, it may be difficult for the terminal to distinguish the PSCCH region and the PSSCH region when measuring CBR. Accordingly, CBR measurement can be performed on both the PSCCH region and the symbols of the PSSCH region without distinguishing the PSCCH region from the PSSCH region.

In addition, when a PSFCH region exists as shown in FIG. 6, since it is a channel via which feedback is transmitted, it may be excluded from CBR measurement from a transmission point of view. For example, the terminal that transmits at least one of control information and data and measures CBR on at least one of PSCCH and PSCCH might not perform CBR measurement on PSFCH. Conversely, since the counterpart terminal receiving the data transmits feedback information via the PSFCH, CBR measurement can be performed on the PSFCH. For CBR measurement for the PSFCH region, the following description is referred to.

CBR measurement in terms of feedback on transmission may be performed for the PSFCH region. The above-described measurement may be described with reference to the PSFCH region shown in FIGS. 6, 7A, and 7B.

In this case, it is assumed that ACK/NACK feedback for transmission is transmitted via PSFCH, and SL CSI feedback for transmission is transmitted via PSFCH. When SL CSI feedback is transmitted via the PSSCH, CBR is measured in the PSSCH region as described above.

X is the value of the size of the window where the CBR is measured, and X can be a fixed value or a configurable value.

When X is one fixed value, X may be configured as 100 slots. When X is a configurable value, the configuration value of X may be included in resource pool configuration information. Before the terminal is RRC connected to the base station, the corresponding values in the terminal may be pre-configured or configured via the SIB from the base station. After the terminal is RRC connected to the base station, X may be configured to be terminal specific. In addition, X may be configured via a PC5-RRC connection between a terminal and a terminal. For example, X may be configured via one of $\{100 \cdot 2\mu, 100\}$ slots via resource pool configuration information. Here, $\mu$ is an index corresponding to numerology and is configured to the following value according to subcarrier spacing (SCS).

SCS=15 kHz, $\mu$=0
SCS=30 kHz, $\mu$=1
SCS=60 kHz, $\mu$=2
SCS=120 kHz, $\mu$=3

If $X=100 \cdot 2\mu$ is configured among the above two configuration methods, if is a method that the CBR window is fixed at 100 ms regardless of the SCS, and when X=100, the measurement time (ms) of the CBR window may vary depending on the SCS.

Sidelink RSSI means received signal strength. For example, the sidelink RSSI indicates the power (unit: [W]) received by the receiving terminal, and is observed by valid OFDM symbol positions of the corresponding channel in the slot of the sidelink and a configured subchannel.

Here, the configured subchannel may mean a subchannel allocated as a resource pool. Also, the subchannel may be configured differently according to the corresponding channel. For example, the PSSCH has a minimum configurable subchannel size of 4 RB and up to 20 subchannels may be allocated. The PSFCH has a minimum configurable subchannel size of 2 RB and up to 40 subchannels can be allocated. The disclosure is not limited thereto, and the size of the subchannel or the maximum number of the subchannels may vary depending on the SCS.

The congestion of the corresponding channel may be determined based on the CBR value measured by the definition of the CBR. The terminal may report the measured CBR to the base station. Specifically, when the base station and the terminal are connected by Uu-RRC, the CBR value measured by the terminal may be reported to the base station via Uu-RRC. In mode 1 of the sidelink resource allocation schemes, when the transmitting terminal requests the base station to transmit resources for performing sidelink communication with the receiving terminal, the base station may allocate the transmission resources using the reported CBR information. Also, the base station may determine transmission parameter information, such as pattern information of a PSSCH demodulation reference signal (DMRS), modulation and coding scheme (MCS), and number of transport layers, and instruct the terminal to transmit the determined transmission parameter information. As described above, the base station may perform signaling for the allocation information for the transmission resource to the transmitting terminal via DCI. The base station may indicate transmission parameter information, such as pattern information of the PSSCH DMRS, MCS configuration, and number of transport layers via the upper layer. For example, the base station may transmit transmission parameter information to the terminal via Uu-RRC. However, the disclosure does not exclude that transmission parameter information, such as pattern information of the PSSCH DMRS, MCS configuration, and number of transport layers, is signaled via DCI. When the sidelink CSI report is transmitted from the receiving terminal, it is necessary to dynamically change transmission parameters, based on the sidelink CSI. In this case, the transmitting terminal does not follow transmission parameters, such as pattern information of the PSSCH DMRS signaled by the base station, MCS configuration, and the number of transport layers, but may determine transmission parameters, such as pattern information of PSSCH DMRS, MCS configuration, and number of transport layers, based on the direct sidelink CSI.

On the other hand, in mode 2 of the sidelink resource allocation schemes, the terminal not only performs resource allocation directly via sensing, but also should determine whether a channel is connected and transmission parameters by reflecting the CBR measured by the terminal. Therefore, in mode 2, the terminal may perform congestion control by measuring a channel occupancy ratio (CR) together with CBR measurement. In this case, the priority of the packet may be reflected. When the transmitting terminal transmits the packet, a value for indicating the priority of the corresponding packet may be transmitted to the receiving terminal via SCI. CR is an index indicating how much the terminal has occupied the channel, and a CR limit for the terminal to occupy the channel may be determined according to the CBR value. For example, when the channel is congested (i.e., when the CBR value is measured high), the CR limit is configured low, and the terminal should perform congestion control so that the measured CR does not exceed the CR limit. In order to perform congestion control, the terminal should drop the transmission or make the CR measured via the scheduling implementation satisfy the CR limit. If the channel is not congested (i.e., when the CBR value is measured low), the CR limit is configured high, and the possibility that the measured CR does not exceed the CR limit increases, so that the terminal may occupy and use the channel more.

Hereinafter, various embodiments of the operation of the terminal for performing congestion control in the NR sidelink are described.

First Embodiment

According to the first embodiment of the disclosure, a terminal may measure the CR for congestion control in mode 2. When the terminal selects a resource via sensing in mode 2 among sidelink resource allocation schemes, the terminal may reserve a resource for transmission of one TB or reserve a resource for transmission of a plurality of TBs. The configuration whether to reserve a resource for transmission of one TB or a plurality of TBs may be determined from a higher level. In addition, in mode 2, the terminal may reserve resources for retransmission of the TB as well as initial transmission of the TB. When the terminal reserves the transmission resource via sensing in mode 2, under the assumption that the transmission occurs on the reserved resource, when the terminal measures CR, a portion that is expected to occupy and use the channel in the future may be calculated as well as a record of occupying and using the channel in the past based on the current time point. Accordingly, the CR measured for PSSCH transmission in slot n may be defined as follows.

Definition of CR Measured for PSSCH Transmission

CR is defined as the total number of the subchannels used for transmission by the terminal to occupy a channel in the slots [n−a, n−1] section and the subchannels granted to be used by occupying the channel in the slots [n, n+b] section divided by the total number of subchannels configured as a transmission resource pool in the slots [n−a, n+b] section.

Here, the channel corresponds to the PSSCH.

Here, the slot index is based on the physical slot index.

Here, a is a positive integer and b is 0 or a positive integer. Also, n+b cannot be configured as a value exceeding the last transmission opportunity granted via transmission resource reservation.

M and N are values defined as a+b+1=M and may be values determined by the terminal implementation to satisfy the condition of a≥N. Here, M=1000 and N=500 may be used, but is not limited thereto. When the values of M and N are configurable, the values of M and N may be included in resource pool configuration information. Before the terminal is RRC connected to the base station, the corresponding values may be pre-configured in the UE or configured via SIB from the base station. After the terminal is RRC connected to the base station, it may be configured as a terminal-specific value. For example, M is a value of one of the $\{1000 \cdot 2^\mu, 1000\}$ slots, and N is a value of one of the $\{500 \cdot 2^\mu, 500\}$ slots, and may be configured via resource pool configuration information. Here, μ is an index corresponding to numerology and is configured to the following value according to subcarrier spacing (SCS).

SCS=15 kHz, μ=0
SCS=30 kHz, μ=1
SCS=60 kHz, μ=2
SCS=120 kHz, μ=3

If $M=1000 \cdot 2^\mu$, $N=500 \cdot 2^\mu$ are configured among the above two configuration schemes, it is a scheme in which the CBR window is fixed at 100 ms regardless of SCS, and if M=1000, N=500 are configured, it is a scheme in which the measurement time (ms) of the CBR window may vary depending on the SCS.

CR is measured for each (re)transmission.

It is assumed that, when calculating CR, the transmission parameter used in slot n is reused even in transmissions granted to occupy and use the channel at slot [n, n+b].

As described via the third embodiment below, CR may be measured for a priority level.

The CR measurement scheme may vary depending on whether the above-described types of transmission, such as broadcast, unicast, and groupcast can be simultaneously configured in one resource pool or separately configured for each resource pool. According to the definition of CR, when different transmission types can be simultaneously configured in one resource pool, CR may be simultaneously measured for all transmission types. When different transmission types are defined to be configured by being divided into resource pools, CRs may be measured separately for each transmission type. Here, broadcast may be referred to as a first transmission type, unicast as a second transmission type, and groupcast as a third transmission type.

According to the CR value measured based on the above-described definition, the degree of channel occupancy of the terminal can be determined by reflecting how much the terminal occupied the channel in the past and how much the channel will occupy in the future. In addition, the terminal should perform congestion control so that the measured CR value does not exceed the CR limit determined by the CBR. Therefore, it is necessary for the CR to be accurately measured. According to the above description, CR is defined under the assumption that transmission occurs in the reserved resource when the terminal reserves the transmission resource via sensing in mode 2. However, depending on the retransmission scheme supported by the NR sidelink, this assumption cannot always be satisfied. Therefore, in order to address the above-described issue, a method of always configuring the above-described b value as 0 can be considered. If b is configured as 0, it means that the calculation for CR is not applied to resources granted to occupy and use the channel at the time of slot [n, n+b], that is, reserved transmission resources. However, in configuring b as 0, the equity of the channel occupancy between a terminal granted to use a large number of resources at the time of slot [n, n+b] and a terminal not granted is not considered. Therefore, hereinafter, a method in which the case of not transmitting to the reserved transmission resource is considered will be described.

Specifically, in the NR sidelink, as a retransmission method, HARQ feedback-based retransmission for performing retransmission based on HARQ-ACK/NACK feedback may be supported as well as blind retransmission that performs retransmission instead of HARQ-ACK feedback information. In the case of the blind retransmission method, retransmission is necessarily performed regardless of whether the initial transmission and reception of the retransmission are successful. However, in the case of the HARQ feedback-based retransmission method, whether to retransmit may be determined based on the ACK/NACK feedback result. In addition, in mode 2 of the NR sidelink, the terminal may reserve transmission resources via sensing for blind retransmission and HARQ feedback-based retransmission methods. In addition, in the case of the HARQ feedback-based retransmission method, a reserved transmission resource may be released based on the HARQ ACK/NACK feedback. For example, when the transmitting terminal receives the ACK for the previous transmission, resources reserved for the next retransmission may be released. For example, in the above definition of CR, when the terminal reserves the transmission resource via sensing, the assumption that the transmission necessarily occurs in the reserved resource is not satisfied. Therefore, in order to accurately measure CR, it is necessary to consider a case where a reserved resource can be released. If the case where the reserved resource can be released is not considered, the greater the maximum number of HARQ feedback-based retransmissions, and the greater the number of resource reservations for the transmission of multiple TBs, the inaccuracy of the CR measurement may increase a lot. In order to address this issue, in the above-described definition of CR, when calculating the sum of the number of subchannels granted to occupy and use the channel at the time of slot [n, n+b], the following calculation method may be applied according to the retransmission method.

Method of Applying Weighted Sum when HARQ Feedback-Based Retransmission is Used

When the HARQ feedback-based retransmission is used in the sidelink, a weighted sum is applied to the number of subchannels granted to occupy and use the channel for the $i^{th}$ transmission of TB at the time of slot [n, n+b]. Here, the weight is defined as W(i), i=1 means initial transmission, i is a positive integer, and it means $i^{th}$ retransmission. The weight for initial transmission is W(1)=1. The following methods can be considered to apply the weight W(i) (i>1) for retransmission.

Method 1: The value of W(i) (i>1) can be determined by the terminal implementation.

Method 2: The value of W(i) (i>1) can be configured. Information about the value of W(i) may be included in resource pool configuration information. Before the terminal is RRC connected to the base station, the corresponding value may be pre-configured at the terminal, or may be configured via SIB from the base station. After the terminal is RRC connected to the base station, it may be configured as a terminal-specific value. In addition, information on W(i) may be configured via a PC5-RRC connection between a terminal and a terminal.

Method 3: W(i)=(0.1)i−1. When the maximum number of retransmissions is 4, W(2)=0.1, W(3)=0.01, and W(4)=0.001.

Method 4: W(2)=0.1, W(i)=0 (i>2). The weighted sum is not applied after the third retransmission.

Method 5: W(i)=0 (i>1). For example, the weighted sum is not applied.

When the blind retransmission method is used in the sidelink, since the retransmission is performed regardless of whether the initial transmission and the reception of the retransmission are successful, the above-described weighted sum is not applied.

When the above-described definition of CR measured for PSSCH transmission and HARQ feedback-based retransmission are used, the measured value of CR to which the weighted sum is applied can be expressed by Equation 1 below.

$$CR = \frac{A + \sum_{i=1}^{NumMAXReTx} W(i)B(i)}{C} \quad \text{Equation 1}$$

In Equation 1, A, B(i), W(i), C, and NumMAXReTx may be defined as follows.

A: The number of subchannels granted to occupy and use the channel at the time of slot [n−a, n−1]

B(i): The number of subchannels granted to occupy and use the channel for the $i^{th}$ transmission of TB at the time of slot [n, n+b]

W(i): Weight applied to the number of subchannels granted to occupy and use the channel for the $i^{th}$ transmission of TB at the time of slot [n, n+b]

C: Total number of subchannels configured as a transmission resource pool at the time of slot [n−a, n+b]

NumMAXReTX: The maximum number of retransmissions supported for one TB

Equation 1 shows a CR calculation method proposed in the disclosure when the HARQ feedback-based retransmission is used, and may be modified to other expressions having the same meaning. In addition, in Equation 1, when W(i)=1 is applied to all i, the weighted sum may also be applied to a blind retransmission method.

As described above, it has been looked at how to reflect the number of subchannels granted to occupy and use the channel at a time of CR window [n, n+b], when b>0 is applied, when HARQ feedback based retransmission is used and blind retransmission is used. This may be described in the following Table 1.

Referring to Table 1 below, when SL HARQ is disabled, it is assumed that blind retransmission is used, and subchannels granted to be used by occupying a channel at a time of CR window [n, n+b] can be reflected in CR calculation without dropping. On the other hand, when SL HARQ is disabled, HARQ feedback based retransmission is assumed to be used, and subchannels granted to be used by occupying a channel at a time of CR window [n, n+b] can be assumed that it can be released, based on HARQ feedback. At this time, when HARQ feedback-based retransmission is used for accurate CR calculation, the proposed weighted application method may be applied.

TABLE 1

In evaluating SL CR, the UE shall assume the transmission parameter used at slot n is reused according to the existing grant(s) in slot [n + 1, n + b] without packet dropping if SL HARQ feedback is disabled.
In evaluating SL CR, the UE shall assume the transmission parameter used at slot n is reused according to the existing grant(s) in slot [n + 1, n + b] and the existing grant(s) can be released by the UE if SL HARQ feedback is enabled.

Referring to Table 1, when evaluating SL CR, if the SL HARQ feedback is deactivated, the terminal may assume that the transmission parameter used in slot n is reused according to the existing grant(s) of slot [n+1, n+b] without dropping packets. In addition, when evaluating SL CR, the terminal may assume that the transmission parameter used in slot n is reused according to the existing grant(s) of slot [n+1, n+b], and if the SL HARQ feedback is deactivated, the existing grant (s) can be released by the terminal.

As described above, a blind retransmission method performing retransmission based on HARQ feedback information and a HARQ feedback based retransmission method performing retransmission based on HARQ ACK/NACK feedback are considered in the NR sidelink. The two retransmission schemes described above can be used by being classified by a transmission type. In the case of broadcast communication, since HARQ feedback is not supported, blind retransmission may be used. In the case of unicast or groupcast communication, since HARQ feedback is supported, at least one of blind retransmission or HARQ feedback based retransmission methods may be established and used.

In the above-described embodiment of the disclosure, a case in which a blind retransmission is configured and a case in which HARQ feedback-based retransmission is configured has been described separately. However, the disclosure is not limited thereto. In mode 2 of the NR sidelink, blind retransmission and HARQ feedback-based retransmission may be simultaneously configured and used. For example, when a maximum of 4 retransmissions is granted, blind retransmission is used until 2 retransmissions, and whether additional retransmissions are performed may be determined based on HARQ feedback. For example, it may be determined whether additional retransmission is based on the HARQ feedback result. For example, blind retransmission is performed until the first 2 retransmissions, and when NACK is continuously received, additional HARQ feedback-based retransmission may be performed or 2 blind retransmissions may be performed. In general, by considering the above method, when the number of blind retransmissions is configured as A, the number of HARQ feedback-based retransmissions is configured as B, and up to four retransmissions are granted, examples in which A and B are configured as follows can be considered.

Example 1: A=0, B=4
Example 2: A=1, B=1
Example 3: A=1, B=2
Example 4: A=2, B=0

A=0 means that the blind retransmission is off, A=1 means 2 consecutive blind retransmissions, and A=2 means 4 consecutive blind retransmissions. In addition, B=0 means a case where HARQ feedback-based retransmission is off, and B=1 means a case in which whether to perform two blind retransmissions after the first two blind retransmissions can be determined based on HARQ feedback. In addition, B=2 means that the first two blind retransmissions occur, and whether the third and fourth retransmissions are determined based on HARQ feedback. In addition, B=4 means that all four retransmissions are determined based on HARQ feedback. As described above, even when the blind retransmission and the HARQ feedback-based retransmission are simultaneously configured (i.e., Example 2, Example 3), the proposed CR calculation method may be applied. Specifically, when blind retransmission and HARQ feedback-based retransmission are simultaneously supported, for resources reserved for HARQ feedback-based retransmission at the time of slot [n, n+b], A and B described in Examples 1 to 4 described above and B may be applied.

Second Embodiment

According to the second embodiment of the disclosure, a method of measuring CBR by a terminal and a method of exchanging CBR information by a transmitting end and a receiving end are proposed in order to control congestion in a side link of V2X. In the NR sidelink, not only CBR measurement for transmission but also CBR measurement for transmission feedback may be considered. In the case of LTE sidelink, HARQ ACK/NACK feedback or sidelink CSI feedback is not considered. However, in the case of the NR sidelink, since the HARQ ACK/NACK feedback and the sidelink CSI feedback are considered, the operation of the receiving terminal for feedback on transmission may be considered for congestion control, in addition to the operation of the transmitting terminal. Therefore, the transmitting terminal can measure the CBR from the transmission point of view, and the receiving terminal can measure the CBR from the feedback point of view for transmission. The CBR measurement of the terminal in the sidelink may be defined as a default feature or may be defined as an optional feature. Also, regardless of CBR measurement capability, a case in which CBR is not used via configuration by an upper layer may be considered. When the CBR measurement is configured as a selectable operation, the CBR measurement capability may be divided into four cases as shown in Table 2 below according to the CBR measurement capability of the transmitting terminal and the receiving terminal.

TABLE 2

|  | CBR measurement capability of the transmitting terminal | CBR measurement capability of the receiving terminal |
| --- | --- | --- |
| First case | X | X |
| Second case | X | O |
| Third case | O | X |
| Fourth case | O | O |

Referring to Table 2, when the CBR measurement of the terminal is determined as the basic operation in the sidelink, the CBR measurement capability of the terminals may correspond to the fourth case.

Figure 9:
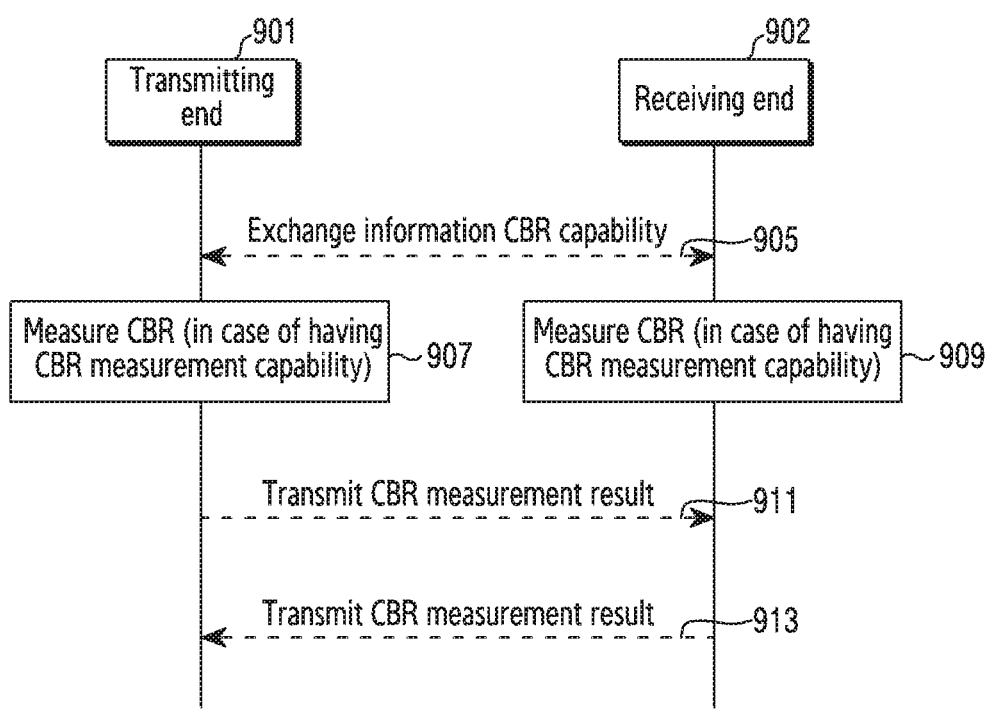
FIG. 9 illustrates a signal flow for measuring and delivering a channel busy ratio (CBR) in a wireless communication system according to an embodiment of the disclosure.

FIG. 9 illustrates a signal flow for measuring and delivering a channel busy ratio (CBR) in a wireless communication system according to an embodiment of the disclosure. FIG. 9 illustrates signal exchange between a transmitting end 901 and a receiving end 902.

The transmitting end can be understood as the subject that transmits the signal, and the receiving end can be understood as the subject that receives the signal. Accordingly, in the V2X system, the transmitting terminals can operate as the transmitting end and the receiving terminal as the receiving end. For example, in FIG. 9, the CBR measurement according to the CBR measurement capability of the transmitting terminal and the receiving terminal and, if necessary, the operation of transmitting the measured CBR to the receiving terminal or transmitting the CBR measured by the receiving terminal to the transmitting terminal will be described.

Referring to FIG. 9, in operation 905, the transmitting end 901 and the receiving end 902 exchange information about CBR capability. As described above, when the transmitting terminal measures the CBR from the transmission point of view and the receiving terminal measures the CBR from the feedback point of view for transmission, the transmitting terminal and the receiving terminal may need information about each other's CBR capability. For example, when the transmitting terminal and the receiving terminal acquire information on each other's CBR capability, when the transmitting terminal requests the sidelink CSI, the transmitting terminal may indicate the receiving terminal to feedback the sidelink CSI by reflecting the CBR. As another example, if the receiving terminal has a CBR capability, assuming that it is a basic operation for the receiving terminal to report the sidelink CSI, based on the CBR, the transmitting terminal may determine whether the CBR is reflected in the SL CSI reported by the receiving terminal. In addition, according to the environment of the transmitting terminal and the receiving terminal, the difference between the CBR measured by the transmitting terminal and the CBR measured by the receiving terminal may increase. Therefore, when the transmitting terminal and the receiving terminal know each other's CBR capability, they may request each other's CBR information if necessary. Information on the CBR capability of the transmitting terminal and the receiving terminal may be exchanged during the PC5-RRC connection process. As described in FIGS. 4 and 5, in the case of unicast transmission of a side link, PC5-RRC connection may be performed between terminals.

Referring to FIG. 9, a CBR measurement may be performed by a transmitting terminal or a receiving terminal having CBR measurement capability (operations 907 and 909). In addition, according to the sidelink situation, a situation in which the transmitting terminal or the receiving terminal cannot measure the CBR may occur despite the capability of CBR measurement. In addition, according to the environment of the transmitting terminal and the receiving terminal, the difference between the CBR measured by the transmitting terminal and the CBR measured by the receiving terminal may increase. In this case, in operation 911, the transmitting end may transmit the CBR measurement result to the receiving end, or in operation 913, the receiving end may transmit the CBR measurement result to the transmitting end. Referring to FIG. 9, operations 911 and 913 are illustrated as being sequentially performed, but this is for convenience of description, and operations 911 and 913 may be performed in any order.

For example, in the case of a transmitting terminal having CBR measurement capability, the transmitting terminal may measure the CBR (operation 907) and transmit the measured CBR measurement result to the receiving terminal (operation 911).

Similarly, in the case of a receiving terminal having CBR measurement capability, the receiving terminal may measure the CBR (operation 909) and transmit the measured CBR measurement result to the transmitting terminal (operation 913).

Further, when both the transmitting terminal and the receiving terminal have CBR measurement capability, operations 911 to 913 may be performed.

However, the embodiment of the disclosure is not limited thereto, and even when the transmitting terminal and the receiving terminal have CBR measurement capability, the operation of transmitting the CBR measurement result may be omitted. For example, the transmitting terminal with CBR measurement capability might not perform operation 911, and the receiving terminal with CBR measurement capability might not perform operation 913.

For example, whether to transmit the measured CBR information may be determined by the terminal according to the channel environment. Alternatively, whether to transmit the CBR measurement result may be predetermined or configured (e.g., CBR transmission may be configured to be performed when the receiving terminal or the transmitting terminal has CBR measurement capability).

Alternatively, the CBR measurement result may be transmitted according to an indicator for indicating the transmission of the CBR measurement result. For example, the transmitting terminal receiving the CBR measurement capability of the receiving terminal may transmit an indicator for indicating the receiving terminal to transmit the CBR measurement result. Accordingly, the transmitting terminal can receive the CBR measurement result from the receiving terminal.

When the transmitting end and the receiving end have each other's CBR information, the transmitting end and the receiving end can more accurately determine the channel congestion. Specifically, the CBR level may be determined using both the CBR level (RX) of the receiving end and the CBR level (TX) of the transmitting end. For example, the CBR level may be determined based on Max(CBR level (TX), CBR level (RX)), which is the maximum value among the CBR level of the transmitting end and the CBR level of the receiving end. In this case, the worst case for the CBR of the transmitting end and the receiving end may be considered. Hereinafter, CBR information of the transmitting end and the receiving end described in the second embodiment may be reflected to configure the CR limit reflecting the CBR and the transmission and feedback parameter range.

Third Embodiment

According to the third embodiment of the disclosure, congestion control may be performed so that the CR value measured based on the CR defined in the first embodiment does not exceed the CR limit determined by the CBR. When the terminal receives the CR limit using the higher layer parameter and the terminal transmits the PSSCH in slot n, the value of priority k should satisfy the condition of Equation 2.

$$\Sigma_{i \geq k} CR(i) \leq CR_{Limit}(k) \quad \text{Equation 2}$$

Here, CR(i) means a CR value measured in slot n−Y for PSSCH transmission in which the priority level of the priority field in SCI is configured as i. Here, the value of Y is a processing time required before measuring the CR and transmitting PSSCH in slot n, which may be defined in units of slots, and the value of Y may be a fixed value or a configurable value.

Alternatively, unlike this, the value of Y may be determined as shown in Table 3 according to the SCS. In Table 3 below, μ is the value corresponding to SCS.

TABLE 3

| μ | (in slot) |
|---|---|
| 0 | 2 |
| 1 | 2 |
| 2 | 3 |
| 3 | 4 |

In Table 3, the value of Y that varies depending on the SCS is proposed based on the PSSCH preparation time in the NR system. Specifically, it is assumed that the PUSCH preparation time in the NR system is 10 symbols when μ=0, 12 symbols when μ=1, 23 symbols when μ=2, and 36 symbols when μ=3.

For example, if the value of Y is one fixed value, it may be Y=4. Further, when the value of Y can be configured, information for indicating the value of Y may be included in the resource pool configuration information. Before the terminal is RRC connected to the base station, the corresponding values in the terminal may be configured in advance and may be configured from the base station via the SIB. After the RRC connection with the base station, it may be configured as a terminal-specific value. In addition, the value of Y may be configured via a PC5-RRC connection between a terminal and a terminal. In addition, $CR_{Limit}(k)$ is a CR limit value determined to correspond to the value of the CR measured in n−Y and the value of priority k, and may be configured using a higher parameter. Specifically, the CR limit value may be determined by the CBR value measured in slot n−Y. It will be described below in FIG. 10 below. The terminal should drop the transmission of the PSSCH in slot n or satisfy the CR limit of Equation 2 via the terminal implementation. Equation 2 may be applied to a terminal transmitting a sidelink CSI when the sidelink CSI is transmitted via the PSSCH. In a case that the terminal transmitting the sidelink CSI reports the sidelink CSI via the PSSCH, when the CR measured by the terminal does not satisfy the condition of Equation 2, an operation of satisfying the CR limit of Equation 2 via dropping the report of the sidelink CSI by the terminal or terminal implement may be considered.

In Equation 2 described above, the performance of congestion control by the transmitting terminal via CR measurement on the PSSCH has been described. However, in the NR sidelink, congestion control by the receiving terminal via CR measurement of the PSFCH may be considered. As described above, when the HARQ feedback-based retransmission method is used, HARQ feedback information may be transmitted to the PSFCH, and as illustrated in FIGS. 6, 7A, and 7B, CBR may be measured in a region where the PSFCH is transmitted. Therefore, congestion control may be performed so that the CR limit determined by the CBR measured in the area where the PSFCH is transmitted does not exceed. When the terminal is configured the CR limit via the upper parameter and the receiving terminal in slot n transmits the HARQ ACK/NACK feedback to the transmitting terminal via the PSFCH, the priority value k should satisfy the following condition expressed by Equation 3.

$$\Sigma_{i \geq k} CR^{FB}(i) \leq CR_{Limit}^{FB}(k) \quad \text{Equation 3}$$

Here, $CR^{FB}(i)$ means a CR value measured in slot n−Z for a PSFCH in which HARQ ACK/NACK feedback for PSSCH transmission in which the priority level of the field is configured as i is transmitted in SCI. Here, the value of Z is a processing time required before measuring CR and transmitting PSFCH in slot n, which may be defined as a unit of slots. The value of Z may be a fixed value or a configurable value.

Alternately, unlike this, the value of Z may be determined according to SCS as shown in Table 3 above. For example, when the value of Z is one fixed value, it may be Z=4. In addition, when the value of Z can be configured, information for indicating the value of Z may be included in resource pool configuration information. Before the terminal is RRC connected to the base station, the corresponding values in the terminal may be configured in advance and can be configured from the base station via the SIB. After the terminal is RRC connected to the base station, it may be configured to be terminal-specific. Further, the value of Y may be configured via a PC5-RRC connection between the terminal and the terminal. In addition, the definition of CR measured by the receiving terminal for PSFCH transmission is referred to. In addition, $CR_{Limit}^{FB}(k)$ is a CR limit value determined to correspond to a value of priority CR and a value of n measured in n−Z, and may be configured via upper parameters. Specifically, the CR limit value may be determined by the CBR value measured in slot n−Z. This will be described below in FIG. 11. The terminal should satisfy the CR limitation of Equation 3 by dropping HARQ ACK/NACK transmission to the PSFCH in slot n or via terminal implementation.

Unlike the definition of CR measured by the transmitting terminal for PSSCH transmission, the CR measured for PSFCH transmission by the receiving terminal in slot n may be defined as follows.

Definition of CR Measured for PSFCH Transmission
    CR is defined as a value obtained by dividing the number of subchannels that the terminal occupies and uses a channel at a time of slot [n−a, n−1] by the total number of subchannels configured as PSCFH at a time of slot [n−a, n−1].

Here, the channel corresponds to the PSFCH.

Here, the slot index is based on the physical slot index.

Here, a is a positive integer, fixed to a predetermined value, or may be determined as a configurable value. For example, when a is determined to be a fixed value, a value of a=500 may be considered. However, the value of a may be determined by other values. Alternatively, when the value of a can be configured, information for indicating the value of a may be included in resource pool configuration information. Before the terminal is RRC connected to the base station, the corresponding values may be preconfigured in the UE and may be configured from the base station via SIB. After the RRC connection with the base station, the value of a may be terminal-specific.

CR is measured for each HARQ ACK/NACK transmission.

Figure 11:
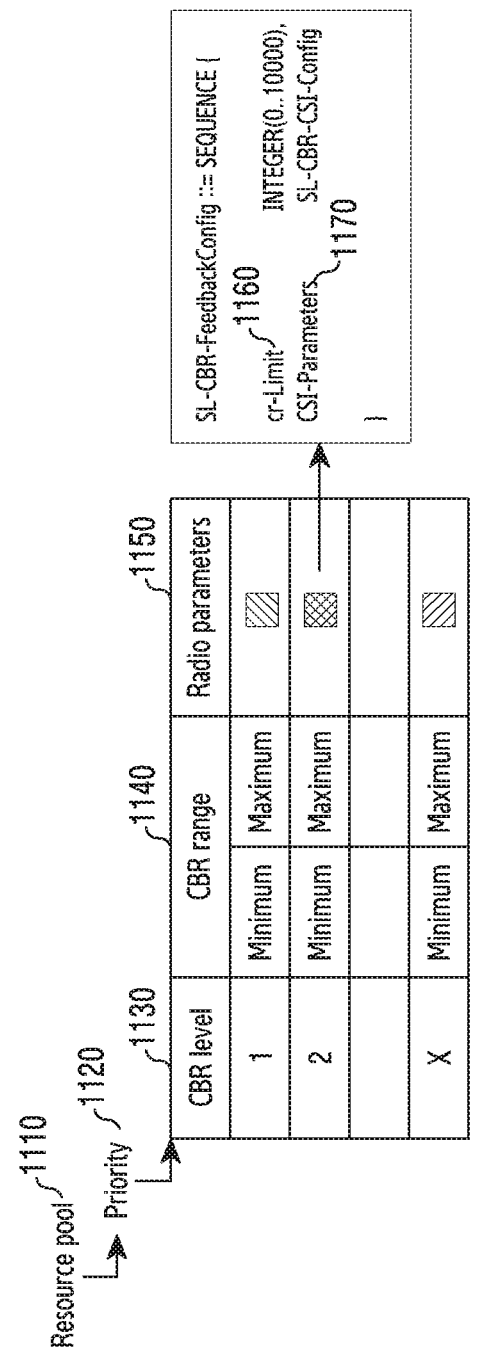
FIG. 11 illustrates configuring of a CR limit and a feedback parameter range in a wireless communication system according to an embodiment of the disclosure.

As described via Equation 3 and FIG. 11, CR may be measured for a priority level.

When the terminal performs HARQ ACK/NACK feedback via PSFCH via Equation 3, the performance of congestion control using CBR and CR has been described. The above-described embodiment is for the operation in which, even when the HARQ ACK/NACK feedback is enabled and the HARQ feedback-based retransmission method is used, the receiving terminal does not feedback HARQ ACK/NACK to the transmitting terminal when the condition of Equation 3 is not satisfied for congestion control. In addition, other congestion control methods may be considered for HARQ ACK/NACK feedback. For example, the CBR measurement value for the PSFCH channel may be used without using the CR measurement in Equation 3. In this case, the CBR measurement value for the PSFCH channel may be used by both the transmitting terminal and the receiving terminal. When the HARQ ACK/NACK feedback is disabled and the HARQ feedback-based retransmission method is used, the transmitting terminal may measure the CBR for the PSFCH channel, and when the measured value is greater than the configured threshold, the transmitting terminal may cancel the request for HARQ ACK/NACK feedback from the receiving terminal. Specifically, the transmitting terminal may indicate HARQ ACK/NACK feedback cancellation information by including 1 bit of information in the SCI. Alternatively, when HARQ ACK/NACK feedback is disabled and the HARQ feedback-based retransmission method is used, if the receiving terminal measures the CBR for the PSFCH channel and the measured value is greater than the configured threshold, a method of not HARQ ACK/NACK feedback to the receiving terminal may be used. Here, the threshold may be included in the resource pool configuration information. Before the terminal is RRC connected to the base station, the corresponding values may be pre-configured in the terminal and may be configured via SIB from the base station. After the terminal is RRC connected to the base station, the threshold value may be configured terminal-specifically. In addition, the threshold value may be configured via PC5-RRC connection between a terminal and a terminal.

Fourth Embodiment

Figure 10:
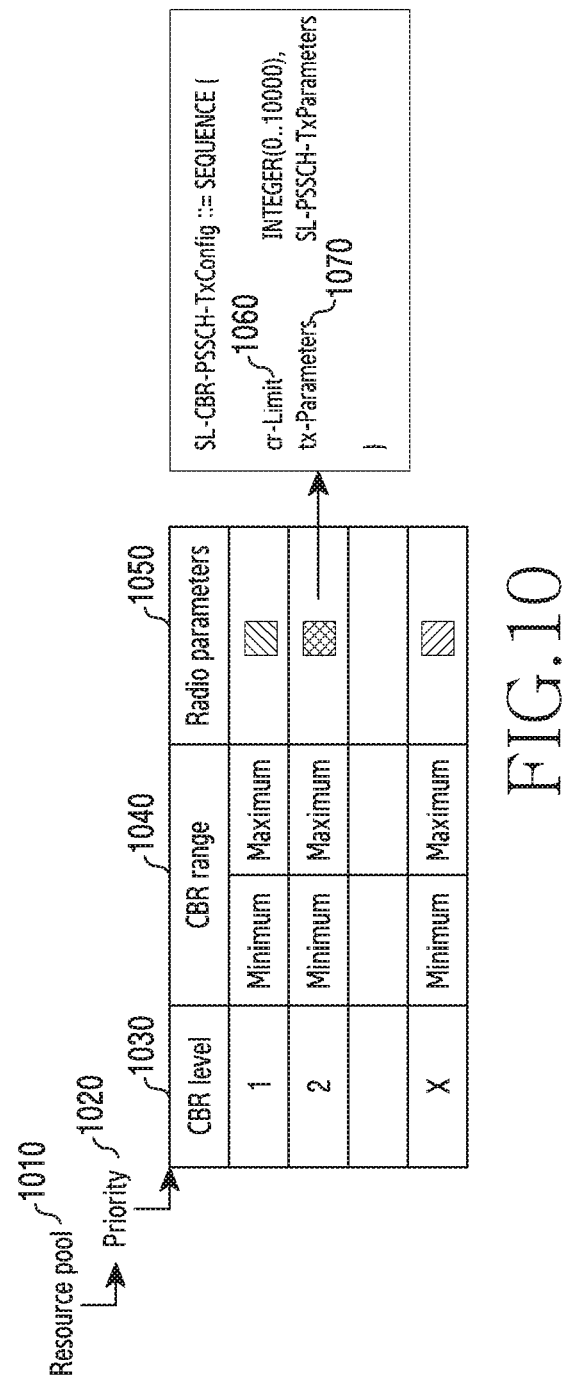
FIG. 10 illustrates configuring of a channel occupancy ratio (CR) limit and a transmission parameter range in a wireless communication system according to an embodiment of the disclosure.

FIG. 10 illustrates configuring of a channel occupancy ratio (CR) limit and a transmission parameter range in a wireless communication system according to an embodiment of the disclosure.

According to the fourth embodiment of the disclosure, congestion control may be performed by determining configuration of a CR limit according to CBR and a range of transmission parameters that can be configured according to CBR. CBR can be measured as a value between 0 and 100, but can be quantized according to the CBR range. For example, X CBR levels are classified, and CBR measurement results may be used by being mapped to a CBR level corresponding to a corresponding CBR range. Therefore, in the sidelink, according to the CBR level and the priority of the packet to be transmitted, a CR limit and a range of configurable transmission parameters can be determined. The terminal may perform congestion control via the CBR and the CR limit mapped to the highest priority of the packet to be transmitted and a range of transmission parameters. Hereinafter, in FIG. 10, an example in which a CR limit and a transmission parameter range is configured according to the priority of a CBR and a packet in a side link is illustrated.

Referring to FIG. 10, via the resource pool configuring 1010, a CR limit 1060 corresponding to a CBR level 1030 and a priority 1020 of a packet to be transmitted and a range 1070 of transmission parameters are configured. Here, the CBR level determined via the resource pool configuring and the CR limit corresponding to the priority of the packet to be transmitted and the range of transmission parameters may be pre-configured at the terminal before the terminal is RRC connected to the base station, and may be configured from the base station via SIB. After the terminal is RRC connected to the base station, the terminal may receive the above-described values terminal-specifically. In addition, the CR limit and the range of transmission parameters corresponding to the CBR level and the priority of packets to be transmitted may be configured via PC5-RRC connection between a terminal and a terminal. According to FIG. 10, the measured CBR may be used by being mapped to the minimum and maximum values of a CBR range 1040 configured according to the corresponding CBR level. According to FIG. 10, the CBR level may be divided into up to X CBR levels. The details of the transmission parameter 1050 range tx-Parameters are described in Table 4 below.

As described above, congestion control may be performed via configuration of a transmission parameter range. For example, when the channel is congested (when the CBR value is measured high), interference between terminals in the congestion situation can be minimized by reducing the size of the subchannel to which the PSSCH is allocated, lowering the maximum value of transmission power, and reducing the number of retransmissions. At the same time, it may be possible to adjust the transmitted signal to be successfully received by configuring the MCS low and reducing the number of transport layers. Therefore, configuring a range of transmission parameters by reflecting the CBR is advantageous for configuring parameters suitable for a channel situation together with congestion control. Hereinafter, a method of configuring a transmission parameter range will be described below via an example of Table 4. The transmission parameter set (SL-PSSCH-TxParameters) described in Table 4 may include a subchannel allocation range (minSubChannel-NumberPSSCH, maxSubchannel-NumberPSSCH), and the number of retransmissions (allowedRetxNumberPSSCH) as well as an MCS configuration range (minMCS-PSSCH, maxMCS-PSSCH), PSSCH DMRS pattern information (additional-dmrsPSSCH), and the number of transport layers (Txlayer-NumberPSSCH). Also, under the assumption that CBR measurement is used, the transmission parameter set (SL-PSSCH-TxParameters) may include the maximum transmission power information (maxTxPower). Some of the parameters included in the transmission parameter set (SL-PSSCH-TxParameters) described in Table 4 below might not be used and other parameters may be additionally considered.

TABLE 4

```
-- ASN1START
SL-PSSCH-TxParameters     ::=   SEQUENCE {
   minMCS-PSSCH                    INTEGER (0..31),
   maxMCS-PSSCH                    INTEGER (0..31),
   Txlayer-NumberPSSCH             ENUMERATED {n1, n2, both,
                                   spare1},
   minSubChannel-                  INTEGER (1.. maxSubChannel),
   NumberPSSCH
   maxSubchannel-                  INTEGER (1.. maxSubChannel),
   NumberPSSCH
   allowedRetxNumberPSSCH          ENUMERATED {n0, n1, n2, n3, all},
   maxTxPower                                    SL-TxPower,
      OPTIONAL                     -- Cond CBR
   additional-dmrsPSSCH            INTEGER (0..3)
}
-- ASN1STOP
```

In Table 4, minMCS-PSSCH and maxMCS-PSSCH may be used to indicate the MCS configuration range. Alternatively, a method of selecting MCS in a range smaller than maxMCS-PSSCH by configuring only maxMCS-PSSCH may be considered. In addition, in Table 4, Txlayer-NumberPSSCH indicates the number of transport layers, n1 indicates 1 layer transport and n2 indicates 2 layer transport. In addition, both means that the terminal can autonomously configure the configuration for ½ layer. In Table 4, allowedRetxNumberPSSCH means the configuration of the number of retransmissions of the terminal, n0 means no retransmission, and n1, n2, and n3 each represents 2, 3, 4 retransmissions, including initial transmission. In addition, all means that the terminal can autonomously configure the corresponding value. In Table 4, a subchannel allocation range may be indicated via minSubChannel-NumberPSSCH and maxSubchannel-NumberPSSCH. Here, the maximum number of subchannels (maxSubChannel) may vary depending on the channel bandwidth and SCS. In Table 4, maxTx-Power indicates the maximum transmission power value limited for congestion control when CBR is used. In Table 4, additional-dmrsPSSCH is pattern information of the PSSCH DMRS, and means the number of additional DMRS symbols. When additional-dmrsPSSCH is configured as 0, it represents only the front-loaded DMRS is transmitted, and when additional DMRS symbol is configured as 3, it represents up to 4 DMRS symbols including front-loaded DMRS are transmitted. DMRS pattern information other than the number of additional DMRS symbols may be included. Here, via the additional-dmrsPSSCH, the density of DMRS may be increased, and via this, the channel estimation performance may be improved in a low SNR region to improve reception performance.

The transmission parameter set (SL-PSSCH-TxParameters) of Table 4 may be configured regardless of CBR. As described in the second embodiment of the disclosure, an operation that does not use CBR via higher configurations may also be considered. When the transmission parameter set (SL-PSSCH-TxParameters) is configured regardless of CBR, it may be applicable only when there is no SL CSI report. In other words, when there is an SL CSI report, a transmission parameter set (SL-PSSCH-TxParameters) cannot be configured regardless of CBR. If there is an SL CSI report, the transmitting terminal identifies the channel state via SL CSI and selects a transmission parameter. In this case, whether or not there is a SL CSI report can be determined by one of the following conditions.

Conditions for Determining Whether or not there is an SL CSI Report

Condition 1: Depending on whether SL CSI reporting is enabled

Condition 2: Depending on whether SL CSI reporting is triggered/activated

Condition 3: Depending on whether the transmitting terminal has received the CSI report from the receiving terminal Condition 1 is a method of determining that SL CSI reporting exists when SL CSI reporting is deactivated. Condition 2 is a method of determining that there is an SL CSI report when the SL CSI report is deactivated and the SL CSI report is activated. Condition 1 and condition 2 may be the same or different depending on how the SL CSI report is triggered and/or activated. For example, when SL CSI reporting is deactivated, when SL CSI reporting is triggered/activated, it corresponds to a case where condition 1 and condition 2 are the same. In addition, condition 3 is a method of determining that there is an SL CSI report when the actual transmitting terminal receives the CSI report from the receiving terminal. According to condition 3, when there is no SL CSI report, a transmission parameter set (SL-PSSCH-TxParameters) may be configured regardless of CBR. If there is no SL CSI report, since the transmitting terminal cannot know the channel state between the terminals, it may be difficult to select the transmission parameter so that the receiving terminal can successfully receive the data transmitted by the transmitting terminal. Therefore, in this case, a transmission parameter set (SL-PSSCH-TxParameters) may be determined for each synchronization source of the terminal according to the absolute speed of the transmitting terminal. Here, the synchronization source may be at least one of a base station or a global navigation satellite system (GNSS). For a terminal that is not Uu-RRC connected to a base station, at least one of a GNSS or a terminal may be a synchronization source. By configuring the threshold value for the absolute speed of the terminal and comparing the absolute speed and the threshold value of the transmitting terminal, a selectable transmission parameter set (SL-PSSCH-TxParameters) can be determined according to whether the speed is greater than or less than the threshold value. At this time, the threshold value may be included in the resource pool configuration information. Before the terminal is RRC connected to the base station, the corresponding values may be preconfigured in the terminal and may be configured via SIB from the base station. After the terminal is RRC connected to the base station, the corresponding values may be configured terminal-specifically. In addition, the terminal may receive a threshold via a PC5-RRC connection between a terminal and a terminal.

Accordingly, a method in which the transmitting terminal selects transmission parameters may be determined according to the following cases.

Case 1: If there is no SL CSI report, and only the transmission parameter set (SL-PSSCH-TxParameters) irrespective of CBR is configured, the transmission terminal may select transmission parameters within the transmission parameter set.

Case 1 corresponds to the case where CBR is not configured by the upper configuration.

Case 1 corresponds to a case where a transmission parameter set according to the absolute speed of the transmitting terminal is used.

Case 1 may be limited to mode 2. In mode 1, the base station may indicate resource scheduling information via DCI, and transmit parameter information other than resource scheduling via Uu-RRC or DCI. At this time, the transmitting terminal follows transmission parameters other than resource scheduling indicated by the base station. In the case that the transmission parameter is not indicated via the Uu-RRC in mode 1, the case 1 may be applied or the transmission parameter may be selected by the terminal implementation. Referring to Table 4, among the parameters included in the SL-PSSCH-TxParameters, the subchannel allocation range (minSubChannel-NumberPSSCH, maxSubchannel-NumberPSSCH) and the number of retransmissions (allowedRetxNumberPSSCH) may be included in resource scheduling information. In SL-PSSCH-TxParameters, parameters excluding the above information may be included in transmission parameter information other than resource scheduling.

Case 2: If there is no SL CSI report, when the first transmission parameter set (SL-PSSCH-TxParameters) irrespective of CBR is configured and the second transmission parameter set (SL-PSSCH-TxParameters) reflecting CBR is configured via the upper configuration, the transmitting terminal selects a transmission parameter within a range of parameters overlapping between the two transmission parameter sets. If there are no overlapping parameters, the transmission parameter is selected by the terminal implementation.

Case 2 corresponds to a case where CBR is configured to be used by a higher configuration.

Case 2 corresponds to a case where a set of transmission parameters according to the absolute speed of the transmitting terminal and a set of transmission parameters reflecting CBR are used.

For example, in the case of the MCS configuring range described in Table 4, since the MCS configuring range of the first transmission parameter set is 0 to 5 and the MCS configuring range of the second transmission parameter set is 3 to 9, the transmission parameter is selected from the overlapping MCS configuring range 3~5.

Case 2 may be limited to mode 2. In Mode 1, the base station may indicate resource scheduling information via DCI and transmission parameter information other than resource scheduling via Uu-RRC or DCI. At this time, the transmitting terminal follows transmission parameters other than resource scheduling indicated by the base station. If, in mode 1, the indication for the transmission parameter is not indicated via Uu-RRC, the case 2 may be applied or the transmission parameter may be selected by terminal implementation. Referring to Table 4, subchannel allocation range (minSubChannel-NumberPSSCH, maxSubchannel-NumberPSSCH) and number of retransmissions (allowedRetxNumberPSSCH) may be included in resource scheduling information among parameters included in SL-PSSCH-TxParameters. In SL-PSSCH-TxParameters, parameters excluding the above information may be included in transmission parameter information other than resource scheduling.

Case 3: When there is SL CSI report and CBR is configured not to be used by a higher level configuration, parameters in the transmission parameter set (SL-PSSCH-TxParameters) are selected by the terminal implementation.

Case 3 may be limited to mode 2. In mode 1, the base station may indicate resource scheduling information via DCI and transmission parameter information other than resource scheduling via Uu-RRC or DCI. At this time, the transmitting terminal follows transmission parameters other than resource scheduling indicated by the base station. If, in mode 1, the transmission parameter is not indicated via Uu-RRC, the transmission parameter may be selected by terminal implementation as in the case 3 above. Referring to Table 4, subchannel allocation range (minSubChannel-NumberPSSCH, maxSubchannel-NumberPSSCH) and retransmission number (allowedRetxNumberPSSCH) may be included in resource scheduling information among parameters included in SL-PSSCH-TxParameters. In SL-PSSCH-TxParameters, parameters excluding the above information may be included in transmission parameter information other than resource scheduling.

Case 4: When there is a SL CSI report and a transmission parameter set (SL-PSSCH-TxParameters) reflecting CBR is configured via a higher level configuration, the transmitting terminal may select a transmission parameter within the transmission parameter set.

Case 4 corresponds to a case where CBR is configured to be used by a higher configuration.

Case 4 may be limited to mode 2. In mode 1, the base station may indicate resource scheduling information via DCI and transmission parameter information other than resource scheduling via Uu-RRC or DCI. At this time, the transmitting terminal follows transmission parameters other than resource scheduling indicated by the base station. If the transmission parameter is not indicated via Uu-RRC in mode 1, the above case 4 may be applied or the transmission parameter may be selected by terminal implementation. Referring to Table 4, subchannel allocation range (minSubChannel-NumberPSSCH, maxSubchannel-NumberPSSCH) and number of retransmissions (allowedRetxNumberPSSCH) may be included in resource scheduling information among parameters included in SL-PSSCH-TxParameters. In SL-PSSCH-TxParameters, parameters excluding the above information may be included in transmission parameter information other than resource scheduling.

Hereinafter, an operation after the transmission terminal selects transmission parameters from the transmission parameter set (SL-PSSCH-TxParameters) of Table 4 is described.

The transmitting terminal may transmit based on the selected MCS and deliver the information to the receiving terminal via SCI.

The transmitting terminal may transmit based on the selected number of transport layers and transmit the corresponding information to the receiving terminal via SCI.

In mode 2, the transmitting terminal may perform resource selection using the sensing result based on the selected subchannel allocation length and the number of retransmissions, and may transmit the determined resource allocation information to the receiving terminal via SCI.

The transmitting terminal may perform transmission using the selected transmission power and transmit information on the reference transmission power to the receiving terminal.

The reference transmission power may be at least one of a transmission power of a synchronization signal, a DMRS transmitted via a physical sidelink broadcast channel (PSBCH), a SL CSI-RS, or another reference signal. The reference transmission power may be referred to as an energy per resource element (EPRE), a synchronization signal of a sidelink set within a system bandwidth (BW), DMRS transmitted via PSBCH, SL CSI-RS, or other sidelinks. It may be defined as an average power (unit: Watt [W]) for a resource element (RE) via which the reference signal is transmitted.

The transmitting terminal may perform transmission using the pattern information of the selected PSSCH DMRS and transmit the information to the receiving terminal via SCI or to the receiving terminal via PC5-RRC.

Fifth Embodiment

FIG. 11 illustrates configuring of a CR limit and a feedback parameter range in a wireless communication system according to an embodiment of the disclosure.

According to the fifth embodiment of the disclosure, a method of performing congestion control on feedback for transmission according to CBR is proposed. As described above, since CSI feedback and HARQ ACK/NACK feedback are considered in the NR sidelink, the operation of the receiving terminal may be considered for feedback on transmission as well as the operation of the transmitting terminal for congestion control compared to the LTE sidelink. CBR may be measured as a value between 0 and 100, but may be quantized according to the CBR range. For example, X CBR levels are classified, and CBR measurement results may be used by being mapped to a CBR level corresponding to a corresponding CBR range. Accordingly, in the sidelink, a CR limit and a range of configurable feedback parameters can be determined according to the CBR level and the priority of packets to be transmitted. The terminal may perform congestion control via a CR limit mapped to the priority of the CBR and the received packet and a range of feedback parameters. Referring to FIG. 11, an example in which a CR limit and a range of feedback parameters are configured according to the priority of the CBR and the packet in the sidelink is illustrated.

Referring to FIG. 11, via the resource pool configuring 1110, a CR limit 1160 corresponding to a CBR level 1130 and a priority 1120 of packets to be transmitted, and a range 1170 of feedback parameters 1150 are configured. Here, the CBR level determined via the resource pool configuration and the range of the CR limit and the feedback parameter 1150 corresponding to the priority of the received packet may be configured in advance at the terminal before the terminal is RRC connected to the base station, and may be configured the SIB via the base station. After the terminal is RRC connected to the base station, the terminal may be configured the above-described values terminal-specifically. In addition, the range of the CR limit and the feedback parameter 1150 corresponding to the CBR level and the priority of the received packet may be configured via a PC5-RRC connection between a terminal and a terminal. According to FIG. 11, the measured CBR may be used by being mapped to the minimum and maximum values of the CBR range 1140 set according to the corresponding CBR level. According to FIG. 11, the CBR level may be divided into up to X CBR levels. Details of the feedback parameter range (CSI-Parameters 1170) are described in Table 5 below.

In this embodiment of the disclosure, a method of determining a CSI feedback parameter according to CBR will be is described. A method of performing congestion control for HARQ-ACK/NACK feedback according to CBR may be described with reference to the third embodiment. As described above, CBR refers to a value at which the terminal measures the congestion of a channel in a certain time period, and the terminal may perform congestion control using the CBR value. In addition, when a receiving terminal generates SL CSI information, a parameter suitable for a channel condition may be selected based on a congestion situation, and when the selected parameter is fed back to the transmitting terminal, the parameter may be used as more effective information for the transmitting terminal to select a transmission parameter. The following methods may be considered for reporting SL CSI in the side link.

SL CSI Transmission Channel
  Method 1: SL CSI is piggybacked and transmitted via PSSCH with data
  Method 2: SL CSI is transmitted via PSSCH without data (SL CSI only transmission)
  Method 3: SL CSI is transmitted via PSFCH In the cases of method 1 and method 2, since the SL CSI is transmitted via the PSSCH, the CBR measured for the above-described PSSCH region may be used. In the case of method 3, since the SL CSI is transmitted via the PSFCH, the measured CBR for the above-described PSFCH region may be used. In this embodiment of the disclosure, a case in which a channel quality indicator (CQI) and a rank indicator (RI) are fed back as SL CSI information is considered. Hereinafter, a method of configuring a feedback parameter range will be described below via Table 5. The feedback parameter set (SL-CBR-CSI-Config) of Table 5 may include a CQI configuration range (minCQI, maxCQI) and an RI configuration range (allowedRI). In addition to the parameters included in the feedback parameter set (SL-CBR-CSI-Config) of Table 5, other parameters may be additionally considered.

TABLE 5

-- ASN1START
SL-CBR-CSI-Config::=   SEQUENCE {
    minCQI              INTEGER (0.. maxCQI-Level-1),
    maxCQI              INTEGER (0.. maxCQI-Level-1),
    allowedRI           ENUMERATED {n1, n2, both, spare1},
}
-- ASN1STOP Referring to Table 5, the RI configuration range (allowedRI) may be determined in a range of the maximum number of transmitting layers supported by the transmitting terminal. In Table 5, allowedRI indicates a reportable RI, n1 indicates rank 1, and n2 indicates rank 2. Both mean that the terminal can autonomously configure the configurations for ranks 1 and 2. In addition, the CQI configuration range (minCQI, maxCQI) may be determined by the SL CQI table used. For example, when the SL CQI table reuses the CQI table used in NR Uu, the CQI configuration range (minCQI, maxCQI) may be determined among a maximum of 16 levels. On the other hand, when the SL CQI table is designed based on the MCS table used in NR Uu, the CQI configuration range (minCQI, maxCQI) may be determined from a maximum of 32 levels. As shown in Table 5, when CQI and RI are reported as SL CSI information, the receiving terminal may select a feedback parameter within the CQI configuration range (minCQI, maxCQI) and the RI configuration range (allowedRI) configured by the CBR level.

Figure 12:
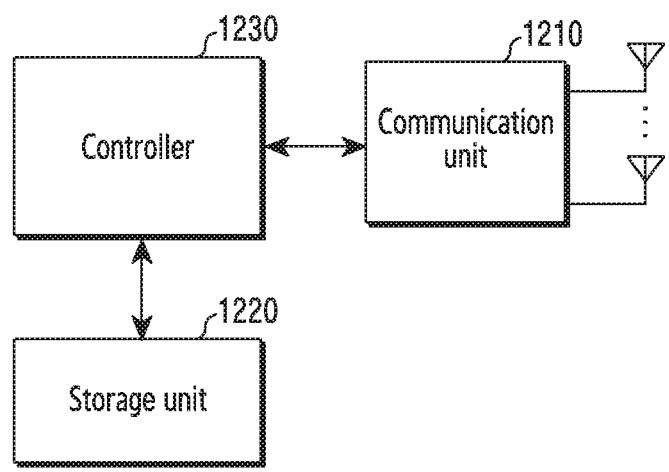
FIG. 12 illustrates a configuration of a terminal in a wireless communication system according to an embodiment of the disclosure.

FIG. 12 illustrates a configuration of a terminal in a wireless communication system according to an embodiment according to an embodiment of the disclosure. Hereinafter, the term, such as " . . . unit", " . . . part" or the like used below means a unit that processes at least one function or operation, which may be implemented by hardware or software, or a combination of hardware and software.

Referring to FIG. 12, the terminal includes a communication unit 1210, a storage unit 1220, and a controller 1230.

The communication unit 1210 performs functions for transmitting and receiving signals via a wireless channel. For example, the communication unit 1210 performs a conversion function between a baseband signal and a bit stream according to a physical layer standard of the system. For example, during data transmission, the communication unit 1210 generates complex symbols by encoding and modulating a transmission bit stream. In addition, during data reception, the communication unit 1210 restores the received bit stream via demodulation and decoding of the baseband signal. Also, the communication unit 1210 upconverts the baseband signal to an RF band signal, transmits the same through an antenna, and down-converts the RF band signal received through the antenna to a baseband signal. For example, the communication unit 1210 may include a transmission filter, a reception filter, an amplifier, a mixer, an oscillator, a DAC, an ADC, or the like.

In addition, the communication unit 1210 may include a plurality of transmission/reception paths. Furthermore, the communication unit 1210 may include at least one antenna array including a plurality of antenna elements. In terms of hardware, the communication unit 1210 may be including digital circuits and analog circuits (e.g., radio frequency integrated circuit (RFIC)). Here, the digital circuit and the analog circuit may be implemented in one package. Also, the communication unit 1210 may include a plurality of RF chains. Furthermore, the communication unit 1210 may perform beamforming.

The communication unit 1210 transmits and receives signals as described above. Accordingly, all or part of the communication unit 1210 may be referred to as a "transmitter", a "receiver", or a 'transceiver". In addition, in the following description, transmission and reception performed via a wireless channel are used in a sense including processing performed as described above by the communication unit 1210.

The storage unit 1220 stores data, such as a basic program, an application program, and configuration information for the operation of the terminal. The storage unit 1220 may be including a volatile memory, a nonvolatile memory, or a combination of a volatile memory and a nonvolatile memory. Then, the storage unit 1220 provides the stored data at the request of the controller 1230.

The controller 1230 controls overall operations of the terminal. For example, the controller 1230 transmits and receives signals through the communication unit 1210. In addition, the controller 1230 writes and reads data in the storage unit 1220. In addition, the controller 1230 may perform functions of a protocol stack required by a communication standard. To this end, the controller 1230 may include at least one processor or microprocessor, or may be a part of the processor. Also, a part of the communication unit 1210 and the controller 1230 may be referred to as a communication processor (CP).

According to various embodiments of the disclosure, the controller 1230 may control the terminal to perform operations according to the various embodiments described above.

Figure 13:
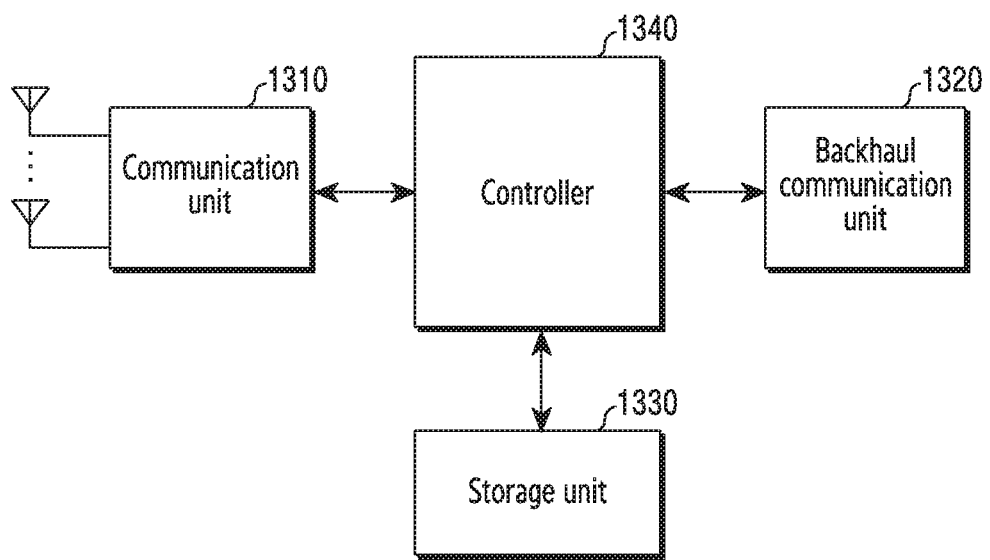
FIG. 13 illustrates a configuration of a base station in a wireless communication system according to an embodiment of the disclosure.

FIG. 13 illustrates a configuration of a base station in a wireless communication system according to an embodiment of the disclosure. Hereinafter, the term, such as " . . . unit", " . . . part" or the like used below means a unit that processes at least one function or operation, which may be implemented by hardware or software, or a combination of hardware and software.

Referring to FIG. 13, the base station includes a communication unit 1310, a backhaul communication unit 1320, a storage unit 1330, and a controller 1340.

The communication unit 1310 performs functions for transmitting and receiving signals via a wireless channel. For example, the communication unit 1310 performs a conversion function between a baseband signal and a bit stream according to a physical layer standard of the system. For example, during data transmission, the communication unit 1310 generates complex symbols by encoding and modulating a transmission bit stream. In addition, during data reception, the communication unit 1310 restores the received bit string via demodulation and decoding of the baseband signal.

In addition, the communication unit 1310 up-converts the baseband signal to a radio frequency (RF) band signal, transmits the same through an antenna, and down-converts the RF band signal received through the antenna to a baseband signal. To this end, the communication unit 1310 may include a transmission filter, a reception filter, an amplifier, a mixer, an oscillator, a digital to analog convertor (DAC), an analog to digital converter (ADC), or the like. Also, the communication unit 1310 may include a plurality of transmission/reception paths. Furthermore, the communication unit 1310 may include at least one antenna array including a plurality of antenna elements.

In terms of hardware, the communication unit 1310 may be including a digital unit and an analog unit, and the analog unit may be including a plurality of sub-units according to operating power, operating frequency, or the like. The digital unit may be implemented with at least one processor (e.g., a digital signal processor (DSP)).

The communication unit 1310 transmits and receives signals as described above. Accordingly, all or part of the communication unit 1310 may be referred to as a 'transmitter', a 'receiver', or a 'transceiver'. In addition, in the following description, transmission and reception performed via a wireless channel are used in a sense including processing performed as described above by the communication unit 1310.

The backhaul communication unit 1320 provides an interface for performing communication with other nodes in the network. For example, the backhaul communication unit 1320 converts a bit stream transmitted from a base station to another node, for example, another access node, another base station, an upper node, a core network, into a physical signal, and converts a physical signal received from another node into a bit stream.

The storage unit 1330 stores data, such as a basic program, an application program, and configuration information for the operation of the base station. The storage unit 1330 may be including a volatile memory, a nonvolatile memory, or a combination of a volatile memory and a nonvolatile memory. Then, the storage unit 1330 provides the stored data at the request of the controller 1340.

The controller 1340 controls overall operations of the base station. For example, the controller 1340 transmits and receives signals via the communication unit 1310 or via the backhaul communication unit 1320. In addition, the controller 1340 writes and reads data in the storage unit 1330. In addition, the controller 1340 may perform functions of a protocol stack required by a communication standard. According to another implementation example, a protocol stack may be included in the communication unit 1310. To this end, the controller 1340 may include at least one processor.

According to various embodiments of the disclosure, the controller 1340 may control the base station to perform operations according to the various embodiments described above.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   determining a plurality of granted transmission resources for a sidelink communication;
   performing a transmission or a retransmission using at least one transmission resource among the plurality of granted transmission resources;
   receiving an acknowledgement (ACK) for the transmission or the retransmission;
   in response to the ACK, releasing one or more transmission resources among the plurality of granted transmission resources;
   measuring a channel occupancy ratio (CR) from transmission resources other than the released one or more transmission resources from the plurality of granted transmission resources; and
   transmitting a physical sidelink shared channel (PSSCH) to satisfy a condition that the measured CR does not exceed a configured CR limit so that a congestion control is performed.

2. The method of claim 1,
   wherein the CR is a value of a total number of subchannels used for transmission by the terminal in slots [n−a, n−1] and subchannels granted to be used in slots [n, n+b] divided by a total number of configured subchannels in a transmission pool in slots [n−a, n+b],
   wherein a is a positive integer, b is 0 or a positive integer, a+b+1=M,
   wherein M is included in resource pool configuration information, and
   wherein n, a, and b indicate numbers associated with a physical slot index.

3. The method of claim 2,
   wherein M is 1000 or 1000·$2^{\mu}$ slots, and
   wherein $\mu$ is an index for numerology, and is related to subcarrier spacing (SPS).

4. The method of claim 1, further comprising:
   measuring a channel busy ratio (CBR) from orthogonal frequency division multiplexing (OFDM) symbols configured for a physical sidelink control channel (PSCCH) and a PSSCH of the sidelink communication,
   wherein the CR limit is associated with the measured CBR.

5. The method of claim 4,
   wherein the CBR is a ratio of subchannels in which a sidelink received signal strength indicator (SL RSSI) is measured by the terminal exceed a threshold value which is configured or preconfigured in slots [n−a, n−1],
   wherein a is a time window size for the CBR,
   wherein a is included in resource pool configuration information, and
   wherein n and a indicate numbers associated with a physical slot index.

6. The method of claim 5,
   wherein a is 1000 or 1000·$2^{\mu}$ slots, and
   wherein $\mu$ is an index for numerology, and is related to subcarrier spacing (SPS).

7. The method of claim 4,
   wherein, when at least one physical sidelink feedback channel (PSFCH) resource is configured, the at least one PSFCH resource is excluded from the measurement of the CBR.

8. A terminal in a wireless communication system, the terminal comprising:
a transceiver; and
at least one processor configured to:
determine a plurality of granted transmission resources for a sidelink communication,
perform a transmission or a retransmission using at least one transmission resource among the plurality of granted transmission resources,
receive an acknowledgement (ACK) for the transmission or the retransmission,
in response to the ACK, release one or more transmission resources among the plurality of granted transmission resources,
measure a channel occupancy ratio (CR) from transmission resources other than the released one or more transmission resources from the plurality of granted transmission resources, and
transmit a physical sidelink shared channel (PSSCH) to satisfy a condition that the measured CR does not exceed a configured CR limit so that a congestion control is performed.

9. The terminal of claim 8,
wherein the CR is a value of a total number of subchannels used for transmission by the terminal in slots [n−a, n−1] and subchannels granted to be used in slots [n, n+b] divided by a total number of configured subchannels in a transmission pool in slots [n−a, n+b],
wherein a is a positive integer, b is 0 or a positive integer, a+b+1=M,
wherein M is included in resource pool configuration information, and
wherein n, a, and b indicate numbers associated with a physical slot index.

10. The terminal of claim 9,
wherein M is 1000 or $1000 \cdot 2^{\mu}$ slots, and
wherein $\mu$ is an index for numerology, and is related to subcarrier spacing (SPS).

11. The terminal of claim 8,
wherein the at least one processor is further configured to:
measure a channel busy ratio (CBR) from orthogonal frequency division multiplexing (OFDM) symbols configured for a physical sidelink control channel (PSCCH) and a PSSCH of the sidelink communication, and
wherein the CR limit is associated with the measured CBR.

12. The terminal of claim 11,
wherein the CBR is a ratio of subchannels in which a sidelink received signal strength indicator (SL RSSI) is measured by the terminal exceed a threshold value which is configured or preconfigured in slots [n−a, n−1],
wherein a is a time window size for the CBR,
wherein a is included in resource pool configuration information, and
wherein n and a indicate numbers associated with a physical slot index.

13. The terminal of claim 12,
wherein a is 1000 or $1000 \cdot 2^{\mu}$ slots, and
wherein $\mu$ is an index for numerology, and is related to subcarrier spacing (SPS).

14. The terminal of claim 11,
wherein, when at least one physical sidelink feedback channel (PSFCH) resource is configured, the at least one PSFCH resource is excluded from the measurement of the CBR.

* * * * *